United States Patent
Gahlot et al.

(10) Patent No.: US 10,320,703 B2
(45) Date of Patent: *Jun. 11, 2019

(54) PREVENTING DATA CORRUPTION DUE TO PRE-EXISTING SPLIT BRAIN

(71) Applicant: Veritas Technologies LLC, Mountain View, CA (US)

(72) Inventors: Jai Gahlot, Maharashtra (IN); Amol S. Katkar, Assam (IN); Udipta Das, Maharashtra (IN); Pranav Peshwe, Assam (IN)

(73) Assignee: Veritas Technologies LLC, Santa Clara, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 14/870,920

(22) Filed: Sep. 30, 2015

(65) Prior Publication Data
US 2017/0094003 A1    Mar. 30, 2017

Related U.S. Application Data

(63) Continuation of application No. 14/870,390, filed on Sep. 30, 2015.

(51) Int. Cl.
*H04L 12/911*    (2013.01)
*H04L 29/08*    (2006.01)
(Continued)

(52) U.S. Cl.
CPC ........ *H04L 47/746* (2013.01); *G06F 11/1425* (2013.01); *G06F 11/2028* (2013.01);
(Continued)

(58) Field of Classification Search
CPC ....... H04L 47/746; H04L 12/18; H04L 41/06; H04L 41/0806; H04L 41/5054;
(Continued)

(56) References Cited

U.S. PATENT DOCUMENTS 5,999,712 A * 12/1999 Moiin .................. G06F 9/5061
370/254
6,192,483 B1    2/2001 Moiin et al.
(Continued)

FOREIGN PATENT DOCUMENTS

EP    1117070    7/2001

OTHER PUBLICATIONS

Herr, Anthony. "Symantec Cluster Server 6.2 I/O Fencing Deployment Considerations," https://vox.veritas.com/qsuop67736/attachments/qsuop67736/Articles-Business-Continuity/159/1/IOFencing_whitepaper-6.2-2014-final.pdf, Dec. 10, 2014, pp. 1-29.

*Primary Examiner* — Blake J Rubin
(74) *Attorney, Agent, or Firm* — Campbell Stephenson LLP

(57) ABSTRACT

Various methods, systems, and processes to prevent data corruption caused by a pre-existing split brain condition in a cluster are presented. In response to determining that a node is no longer part of a sub-cluster, another node in the sub-cluster is designated as a racer node. The racer node accesses a matrix, and the matrix includes information to determine whether a majority of coordination points in a cluster are accessible by nodes in the sub-cluster. Based on the accessing, a determination is made that the information indicates that the majority of coordination points are accessible by the nodes. The information is then broadcasted.

20 Claims, 23 Drawing Sheets

(51) Int. Cl.
  *H04L 12/18* (2006.01)
  *H04L 12/24* (2006.01)
  *G06F 11/14* (2006.01)
  *G06F 11/20* (2006.01)

(52) U.S. Cl.
  CPC ...... *G06F 11/2046* (2013.01); *G06F 11/2094* (2013.01); *H04L 12/18* (2013.01); *H04L 41/06* (2013.01); *H04L 41/0806* (2013.01); *H04L 41/12* (2013.01); *H04L 41/5054* (2013.01); *H04L 67/1095* (2013.01); *H04L 67/16* (2013.01); *H04L 67/288* (2013.01)

(58) Field of Classification Search
  CPC ... H04L 67/1095; H04L 67/16; H04L 67/288; G06F 11/1425; G06F 11/2094
  See application file for complete search history.

(56) References Cited

U.S. PATENT DOCUMENTS

| | | | |
|---|---|---|---|
| 6,279,032 B1 | 8/2001 | Short et al. | |
| 6,862,613 B1 | 3/2005 | Kumar et al. | |
| 6,965,936 B1* | 11/2005 | Wipfel | G06F 11/1482 709/201 |
| 7,120,821 B1* | 10/2006 | Skinner | H04L 67/1008 714/4.4 |
| 7,478,263 B1 | 1/2009 | Kownacki et al. | |
| 7,480,816 B1 | 1/2009 | Mortazavi et al. | |
| 7,516,181 B1 | 4/2009 | Du et al. | |
| 7,590,737 B1* | 9/2009 | Chen | G06F 11/004 709/223 |
| 7,631,066 B1* | 12/2009 | Schatz | G06F 9/5016 709/224 |
| 7,778,157 B1 | 8/2010 | Tawri et al. | |
| 7,886,182 B1* | 2/2011 | Coatney | G06F 11/2028 714/11 |
| 8,024,432 B1* | 9/2011 | Sharma | G06F 9/5061 709/203 |
| 8,041,735 B1* | 10/2011 | Lacapra | G06F 16/13 707/783 |
| 8,073,816 B1 | 12/2011 | Luke et al. | |
| 8,108,715 B1* | 1/2012 | Agarwal | G06F 11/0709 714/10 |
| 8,495,323 B1* | 7/2013 | Tatavarty | G06F 9/45558 711/164 |
| 8,578,204 B1* | 11/2013 | Ortenberg | G06F 11/1425 714/2 |
| 8,719,225 B1* | 5/2014 | Rath | G06F 16/27 707/634 |
| 9,098,392 B1* | 8/2015 | Gadiraju | G06F 11/2023 |
| 10,020,980 B2* | 7/2018 | Feng | H04L 41/044 |
| 2003/0065686 A1 | 4/2003 | Callahan et al. | |
| 2004/0153558 A1 | 8/2004 | Gunduc et al. | |
| 2004/0205148 A1* | 10/2004 | Bae | G06F 11/2289 709/213 |
| 2004/0210656 A1 | 10/2004 | Beck et al. | |
| 2005/0177766 A1 | 8/2005 | Lee et al. | |
| 2005/0262382 A1* | 11/2005 | Bain | G06F 9/52 714/4.4 |
| 2006/0168192 A1* | 7/2006 | Sharma | G06F 11/2028 709/224 |
| 2008/0209136 A1* | 8/2008 | Qi | G06F 3/0622 711/148 |
| 2009/0006797 A1* | 1/2009 | Bagal | G06F 21/6227 711/164 |
| 2010/0306573 A1* | 12/2010 | Gupta | G06F 11/1425 714/4.1 |
| 2011/0173692 A1 | 7/2011 | Liu et al. | |
| 2011/0179231 A1* | 7/2011 | Roush | G06F 3/0622 711/152 |
| 2011/0252270 A1 | 10/2011 | Abraham et al. | |
| 2011/0289344 A1 | 11/2011 | Bae et al. | |
| 2011/0307886 A1* | 12/2011 | Thanga | G06F 9/5077 718/1 |
| 2012/0005164 A1 | 1/2012 | Patankar et al. | |
| 2012/0079580 A1* | 3/2012 | Johnsen | H04L 12/462 726/7 |
| 2012/0179771 A1* | 7/2012 | Ganti | G06F 11/1425 709/213 |
| 2013/0039166 A1 | 2/2013 | Brown et al. | |
| 2013/0111261 A1* | 5/2013 | Dalton | G06F 11/1425 714/4.11 |
| 2013/0227009 A1 | 8/2013 | Padmanaban et al. | |
| 2013/0268495 A1* | 10/2013 | Thiel | G06F 11/20 707/691 |
| 2014/0081927 A1* | 3/2014 | Lipcon | G06F 11/2028 707/692 |
| 2014/0173330 A1* | 6/2014 | Samanta | G06F 11/1666 714/4.11 |
| 2015/0058298 A1* | 2/2015 | Earl | G06F 11/1425 707/674 |
| 2015/0169598 A1 | 6/2015 | Lee et al. | |
| 2016/0092540 A1 | 3/2016 | Bihani et al. | |

\* cited by examiner

| Node 120 | CP 170(1) | CP 170(2) | CP 170(3) | CP 170(4) | CP 170(5) | Result 410 | Cluster Members 420 | Cluster Snapshot 430 |
|---|---|---|---|---|---|---|---|---|
| 120(1) | X | X | X | X | X | No | { } | ----- |
| 120(2) | A | B | X | X | X | No | { } | ----- |
| 120(3) | X | X | C | X | E | Yes | {3, 4} | CDE _ _ |
| 120(4) | X | X | X | D | X | Yes | {3, 4} | CDE _ _ |
| 120(5) | A | B | X | X | X | Yes | {3, 4, 5} | ABCDE |
| 120(1) | X | X | X | X | X | Yes | {1, 3, 4, 5} | ABCDE |
| 120(2) | A | B | X | X | X | Yes | {1, 2, 3, 4, 5} | ABCDE |

Coordination Point Reachability Matrix (CPRM) 160

| Node 120 | CP 170(1) | CP 170(2) | CP 170(3) | CP 170(4) | CP 170(5) |
|---|---|---|---|---|---|
| 120(1) | 0 | 0 | 0 | 0 | 0 |
| ~~120(2)~~ | ~~1~~ | ~~1~~ | ~~1~~ | ~~0~~ | ~~0~~ |
| 120(3) | 0 | 0 | 0 | 0 | 1 |
| 120(4) | 0 | 0 | 0 | 1 | 0 |
| 120(5) | 0 | 0 | 1 | 0 | 0 |

Coordination Point Reachability Matrix (CPRM) 160

Coordination Point Reachability Matrix (CPRM) 160

| Node 120 | CP 170(1) | CP 170(2) | CP 170(3) | CP 170(4) | CP 170(5) |
|---|---|---|---|---|---|
| 120(1) | 0 | 0 | 0 | 0 | 1 |
| 120(2) | 1 | 1 | 1 | 0 | 0 |
| 120(3) | 0 | 0 | 1 | 0 | 0 |
| 120(4) | 0 | 0 | 0 | 0 | 0 |
| 120(5) | 1 | 1 | 0 | 1 | 0 |

Bitwise OR Table 1010

| Sub-Cluster Members 1010 | CP 170(1) | CP 170(2) | CP 170(3) | CP 170(4) | CP 170(5) |
|---|---|---|---|---|---|
| {120(1), 120(2)} | 1 | 1 | 1 | 0 | 1 |
| {120(3), 120(4), 120(5)} | 1 | 1 | 1 | 1 | 1 |

1000B

PREVENTING DATA CORRUPTION DUE TO PRE-EXISTING SPLIT BRAIN

CROSS REFERENCE TO RELATED APPLICATIONS

The present patent application is a continuation of U.S. patent application Ser. No. 14/870,390, filed on Sep. 30, 2015, entitled "INPUT/OUTPUT FENCING OPTIMIZATION", and is incorporated by reference herein in its entirety and for all purposes as if completely and fully set forth herein.

FIELD OF HE DISCLOSURE

This disclosure relates to distributed storage and computer systems. In particular, this disclosure relates to preventing data corruption due to pre-existing split brain.

DESCRIPTION OF THE RELATED ART

A cluster is a distributed computer system with several nodes (e.g., computing devices) that work together as a single entity to provide processing power and storage resources. In a cluster, the processing load of the computer system (e.g., a server) is typically spread over more than one computer (or node), thereby eliminating (or minimizing) single points of failure. Therefore, applications and/or programs executing on the cluster can continue to function despite a problem with one computer (or node) in the cluster.

Input/output (I/O) fencing (or more simply, fencing) refers to the process of isolating a node of a cluster, and/or protecting shared resources of the cluster when the node malfunctions (or appears to malfunction). If a cluster has multiple nodes, there is a likelihood that one of the nodes may fail at some point. The failed node may have control over shared resource(s) such as shared storage used (and required) by the other nodes in the cluster.

A cluster must be capable of taking corrective action when a node fails (as noted above). However, data corruption can occur, for example, if two nodes in different sub-clusters or network partitions (of the cluster) attempt to take control of shared storage in an uncoordinated manner. Fencing can be used to either disable the failed node, or disallow access to shared storage, thus ensuring data integrity and preventing data corruption. Therefore, fencing can be used to prevent uncoordinated access to shared storage.

Coordination points (CPs) can be implemented in a cluster to assist with fencing operations. Coordination points provide a lock mechanism to determine which node (or nodes) are allowed to fence off shared storage (e.g., data drives) from other nodes in the cluster. For example, a node must eject the registration key of a peer node from a coordination point before that node is allowed to fence the peer node from shared storage.

"Split-brain" refers to a situation where the availability of data (e.g., from shared storage) is inconsistent due to the maintenance of two separate data sets that overlap in scope. For example, such overlap can occur because of a network partition where two or more sub-clusters (of a cluster) are unable to communicate and synchronize their respective data sets. The data sets of each sub-cluster may randomly serve clients by their own idiosyncratic data set updates, without coordination with other data sets from other sub-clusters. Therefore, when a split-brain condition occurs in a cluster, the decision of which sub-part of the cluster should continue to operate (called an arbitration process, or simply arbitration) can be made by implementing fencing operations using coordination points.

However, the unavailability (or offline status) of one or more coordination points in a high-availability cluster during fencing operations can lead to a loss of data integrity, and can cause data corruption, and/or application failover, among other issues.

SUMMARY OF THE DISCLOSURE

Disclosed herein are methods, systems, and processes to prevent data corruption due to a pre-existing split brain condition in a cluster that may be caused by the performance of input/output (I/O) fencing operations. One such method involves in response to determining that a node is no longer part of a sub-cluster, designating another node in the sub-cluster as a racer node. The racer node accessing a matrix, and the matrix includes information to determine whether a majority of coordination points in a cluster are accessible by nodes in the sub-cluster. Based on the accessing, the method determines that the information indicates that the majority of coordination points are accessible by the nodes, and broadcasting the information.

In one embodiment, the node that is no longer part of the sub-cluster previously provided access to the majority of the plurality of coordination points. In this example, after determining that the node is no longer part of the sub-cluster, and prior to designating the another node as the racer node, the method determines that no nodes in the sub-cluster can individually provide access to the majority of coordination points. In some embodiments, broadcasting the information includes updating the matrix with the information indicating that the majority of coordination points are accessible by the nodes in the sub-cluster. The information is broadcasted to the cluster, and indicates that a fencing race performed by the racer node is successful.

In other embodiments, based on the information, the method inhibits a partitioned node from accessing one or more coordination points of the majority of coordination points accessible by the nodes in the sub-cluster. The inhibiting prevents a pre-existing split brain condition from occurring in the cluster. In certain embodiments, the matrix is a coordination point reachability matrix (CPRM), and the CPRM is replicated across all nodes in the cluster. In other embodiments, coordination points include one or more coordination point servers.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 10A is a table of a CPRM that illustrates a network partition in a cluster, according to one embodiment of the present disclosure.

FIG. 10B is a Bitwise OR table that illustrates a network partition in a cluster, according to one embodiment of the present disclosure.

Figure 1A:
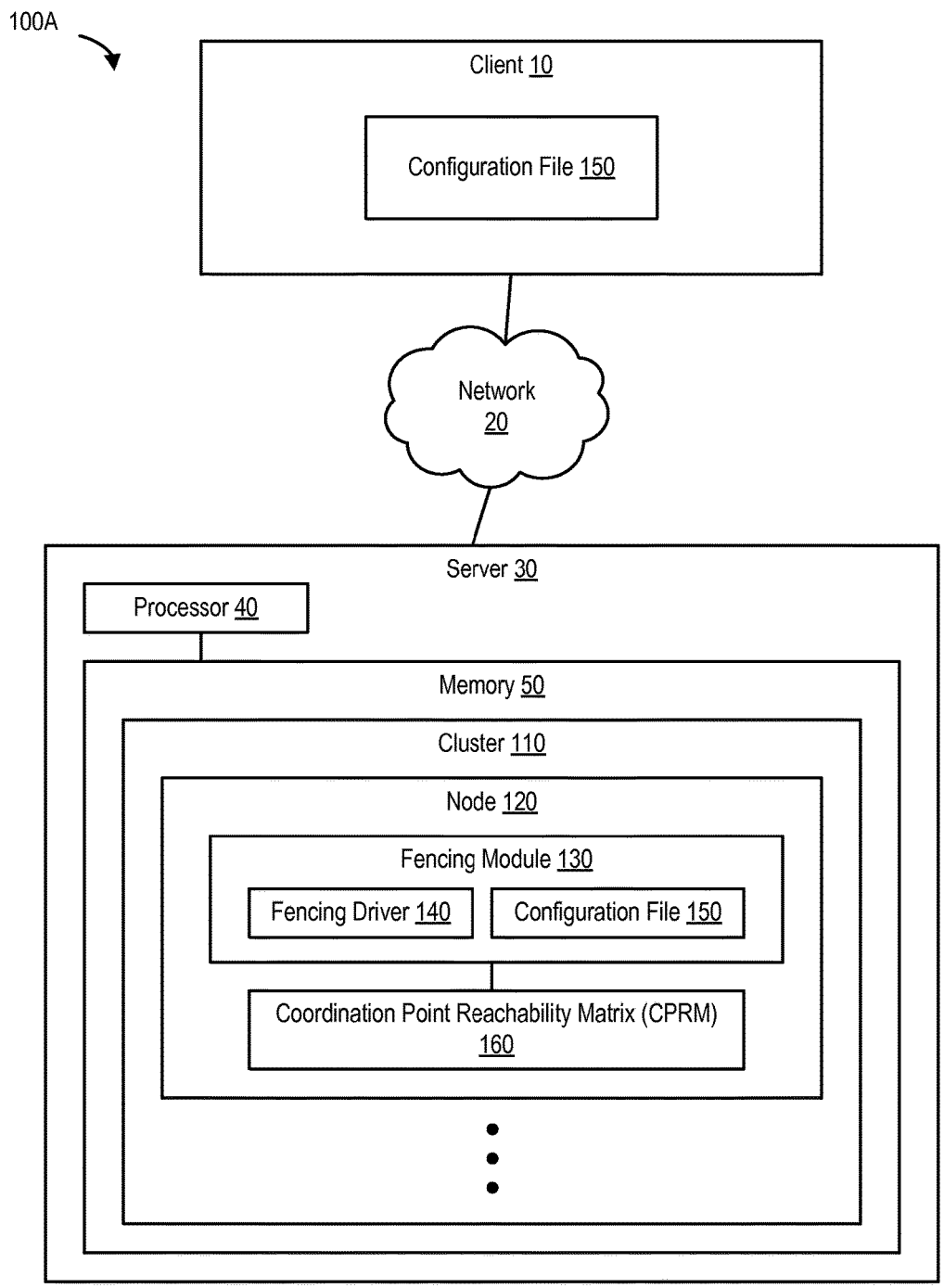
FIG. 1A is a block diagram of a computing system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

As companies increasingly rely on complex computer systems (e.g., distributed storage and/or computing system) for their daily operations, managing the vast amount of data generated and processed is a significant challenge. Large companies typically use application programs to manage large quantities of data stored on different types of storage devices across various networks and operating system platforms.

Storage Area Networks (SANs) including many different types of storage devices can be used to provide storage for hosts. SANs offer a variety of topologies and capabilities for interconnecting storage devices, subsystems, and server systems. For example, a variety of interconnect entities, such as switches, hubs, and bridges, can be used to interconnect these components. These varying topologies and capabilities allow SANs to be designed and implemented that range from relatively simple to highly complex configurations.

As noted, a cluster includes multiple interconnected computers that appear as if they are one computer to end users and applications. Each interconnected computer in the cluster is called a node. The combined processing power of multiple nodes can provide greater throughput and scalability than is available from a single node. In high-availability clusters, multiple nodes can share a storage device for the purpose of data storage, replication and/or deduplication. A shared storage disk/device (e.g., a Cluster Shared Volume (CSV)) can be made accessible for read and write operations by all nodes within a cluster. Each cluster can have multiple CSVs.

In Flexible Shared Storage (FSS) systems, multiple nodes in a cluster share one or more CSVs. Thus, FSS systems enable cluster-wide network sharing of local storage. Local storage can be in the form of Direct Attached Storage (DAS) or internal disk drives. As noted, the network sharing of storage can be enabled through the use of a network interconnect among the nodes of the cluster. The feature allows network shared storage to co-exist with physically shared storage. Therefore, distributed storage systems can be implemented in a multi-node cluster to provide to high-availability of data from one or more storage devices.

Therefore, it is not surprising that distributed computing systems are an important part of research, governmental, and enterprise computing systems. Among the advantages of such computing systems are their ability to handle a variety of different computing scenarios including large computational problems, high volume data processing situations, and, as noted above, high availability situations. For applications that require the computer system to be highly available (e.g., the ability to maintain the system while still providing services to system users), a multi-node cluster is a useful implementation of the distributed computing model.

As noted above, a cluster is a distributed computer system that works together as a single entity to cooperatively provide processing power and mass storage resources. With a cluster, the processing load of the computer system is typically spread over more than one computer, thereby eliminating single points of failure. As a result, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

One known problem in clusters occurs when one or more of the nodes of the cluster erroneously believes that other node(s) are either not functioning properly or have left the cluster. This "split-brain" condition results in the effective partitioning of the cluster into two or more sub-clusters (also called "network partitions"). Causes of the split-brain condition include, among other reasons, failure of the communication channels between nodes, and the processing load on one node causing an excessive delay in the normal sequence of communication among nodes (e.g., one node fails to transmit its heartbeat signal for an excessive period of time).

For example, if a cluster is configured for a failover operation with an application program operating on a first node and a second node existing in the cluster is to takeover for the first node should it fail, then complete failure of a network would lead the second node to conclude that the first node has failed. The second node then begins operation even though the first node has not in fact failed. Thus, the potential exists that both the first node and the second node might attempt to write data to the same portion (or area) of one of the storage devices in the distributed storage system thereby causing data corruption. The solution is to ensure that one of the nodes cannot access the shared storage. As noted above, input/output fencing (or more simply, just fencing) can be implemented to "fence off" the node from the shared storage.

In addition, network partitions can take a variety of other forms and have a variety of detrimental effects. For example, a node might attempt to re-enter a cluster after the node has already been successfully excluded (or removed) from the cluster. Thus, the re-entering node might encounter a cluster environment setup to exclude the node and interpret that instead as a partition event. Additionally, network partitions can be problematic even though there is no shared storage among the nodes (e.g., in so called "shared nothing" clusters). For example, if one node of a cluster is supposed to be the node interacting with a client and another node detects a network partition, the client could ultimately communicate with the wrong node thereby leading to some manner of error.

In the event that communication between the nodes fails, such as when a portion of the network fails during a network partition, each of two or more sub-clusters of nodes can determine that the other sub-cluster of nodes has failed (or might have failed). For example, a race (also called a "fencing race") can occur between the two (or more) sub-clusters of nodes, with control modules of each sub-cluster of nodes determining that the other sub-cluster of nodes is malfunctioning.

As previously noted, node(s) in a first sub-cluster (or network partition) can perform data writes to the storage device(s), while node(s) in the other sub-cluster (or other network partition) can also perform data writes to the same portion(s) of the shared storage devices, resulting in data inconsistency errors. In order to prevent these data inconsistency errors, an "arbitration process" is performed that determines winner and loser sub-clusters (or groups).

Nodes in the winner sub-cluster are determined to keep communicating with the shared storage, whereas nodes in the loser sub-cluster are determined to stop communicating with these shared storage devices. However, nodes in the winner sub-cluster do not determine if or when nodes in the loser sub-cluster(s) will conclude that they have lost arbitration (and thus desist from using the shared storage devices). Thus, in addition to this arbitration process, the control module of the winner sub-cluster of node(s) may perform a fencing process that fences nodes from the loser sub-cluster(s) from the rest of the distributed storage system. The fencing process (or more simply fencing and/or fencing operation) is performed to ensure that nodes from the loser sub-cluster(s) do not communicate with the storage devices, as improper data writes from the loser nodes would cause various data inconsistency and other errors.

Generally, fencing can be performed in two stages. In the first stage, fencing attempts to fence out the loser sub-cluster(s) of nodes. The loser nodes can be notified about the outcome of the arbitration and/or about the fencing process being implemented. Such notification can include the control module(s) of the loser sub-cluster of nodes discovering that the loser sub-cluster lost the arbitration process, the control module(s) of the loser sub-cluster of nodes encountering communication errors that indicate loss of communication, and/or communication from the loser nodes being disabled, among others.

In the second stage, fencing removes loser nodes' access to the storage devices, such as by instructing the shared storage devices (that are accessible to the winner sub-cluster) to not accept any communication from the loser nodes. In this case, even if the control module(s) of the winner sub-cluster of nodes cannot ensure that loser sub-cluster(s) of nodes are no longer performing data writes to the shared storage devices (such as by executing instance(s) of a shared application), the loser nodes will not be able to access/modify application data being used by winner nodes. In effect, this fencing mechanism prevents a portion of the cluster from accessing the shared storage devices in an uncoordinated manner.

However, when performing fencing, it is preferable to use separate computing devices that enable access to shared storage for multiple nodes, and simultaneously blocks access (to shared storage) for other nodes. Using such separate (and independent) computing devices adds resilience to a distributed storage system during fencing operations by providing additional arbitration mechanisms that integrate seamlessly with existing fencing software running on nodes in a cluster. In addition, such separate computing devices act (or function) as intermediary devices that are dedicated to performing (and managing) fencing operations, thus improving the speed and efficiency of the distributed storage system.

Coordination points (CPs) can be implemented in a cluster as the above mentioned separate computing devices to assist with fencing operations. Coordination points provide a lock mechanism to determine which node (or nodes) are allowed to fence off shared storage (e.g., data drives) from other nodes in the cluster. In addition, coordination points are dedicated devices that enable access to shared storage for multiple nodes, and simultaneously block access (to shared storage) for other nodes (in a cluster).

In high-availability clusters, servers, disks, interconnects, and/or other hardware and/or software appliances can be implemented (or used) as coordination points (external to the cluster) to ensure data integrity in case of loss of hardware and/or software components in the cluster. Therefore, coordination points are vital in providing data protection and maintaining high availability in a cluster, and the loss (or unavailability) of coordination points used for fencing affects both these important goals, among others.

Unfortunately, the use coordination points in the context of fencing has (and causes) several problems. Typically, all nodes in a cluster require access to all coordination points (e.g., to be able to perform and win a fencing race by preempting other nodes in the cluster from accessing a shared resource). However, the use coordination points can cause (among other issues): (1) cluster startup failure; (2) sub-optimal fencing race results; and (3) problems with asymmetric/FSS systems.

First, the use (or implementation) of coordination points in the context of I/O fencing can cause, among other shortcomings, cluster start up failure. For example, when a split-brain condition occurs, the decision of the arbitration process to determine which sub-cluster should continue functioning (e.g., by using the results of a fencing race) is made by using coordination points accessible (or reachable) by each node in the cluster (e.g., based on whether nodes in a particular sub-cluster can access one or more of the coordination points). However, even if one of these coordination points are not accessible by all the nodes in the cluster during cluster start up (or deployment), the clustering stack is unable to start up. Therefore, in this example, in addition to cluster start up failure, every coordination points can potentially turn into a single point of failure (thus causing a situation of unavailability of data instead of the required high-availability). In addition, and as a result, a node is unable to join the cluster.

Second, the use of coordination points in the context of fencing can cause a sub-optimal fencing race result. As noted, when performing an arbitration process, the node selected by a sub-cluster to communicate with the coordination points is called a racer node. To successfully fence off other nodes in the cluster, the racer node must be able to remove the nodes not in its own sub-cluster from at least a majority of the coordination points. In this example, even if each coordination is accessible from one (or more) node(s) in the cluster, there may not exist a single node that can access a majority of the coordination points, thereby causing the entire cluster to lose the arbitration process and resulting in total cluster outage.

In addition, during the arbitration process, a sub-cluster can re-elect different nodes as the racer node until a single node that can access (or reach) a majority of the coordination points is found. If no such node is found, the network partition (or sub-cluster) loses the fencing race and panics itself (e.g., leaves the cluster). This process of racer re-election causes delays in the arbitration process and can result in application failover. Further, racer re-election can also result in a smaller and/or less critical partition winning the fencing race. What's more, if none of the sub-clusters have a node that can reach (or access) the majority of the coordination points, all the partitions (or sub-clusters) will lose the fencing race and panic. This situation causes significant downtime of the distributed computing system.

Third, the above problems of cluster start up failure and sub-optimal fencing race results are even more pertinent in asymmetric/FSS systems. For example, FSS environments typically allow fencing configurations that permit asymmetric connectivity to coordination points (e.g., not all nodes need accessibility to the coordination points). In addition, FSS environments often include nodes which do not have connectivity to shared storage (e.g., compute nodes). Therefore, even in FSS environments, it is possible that some (or none) of the nodes will be able to access (or reach) the majority of the coordination points. Such a situation can also cause significant downtime of the distributed storage system and/or application failover.

Accordingly, described herein are processes, methods, and systems to optimize fencing in high-availability clusters that use coordination points to perform fencing operations, and to remedy the shortcomings caused by the use of such coordination points as they pertain to cluster start up failure, sub-optimal fencing race results, and asymmetric/FSS systems.

An Example of an I/O Fencing System that Uses Coordination Points

FIG. 1A is a block diagram of a computing system that implements a fencing module, according to one embodiment. FIG. 1A includes a client 10 and a server 30, connected to each other via a network 20. Network 20 can be a Storage Area Network (SAN) or any other type of interconnection. Client 10 and server 30 can be any type of computing device including a server, a desktop, a laptop, a tablet, and the like. Client 10 includes a configuration file 150.

Server 30 includes a processor 40 and a memory 50. Memory 50 implements the I/O fencing environment in a cluster 110. Cluster 110 further includes a node 120. Node 120 can be any type of computing device including a server, a desktop, a laptop, a tablet, and the like. Node 120 implements a fencing module 130, which further includes a fencing driver 140 and the configuration 150. Node 120 also includes a coordination point reachability matrix (CPRM) 160. It should be noted that server 30 can implement one or more clusters, and the one or more clusters can each implement multiple nodes.

Configuration file 150 is generated by client 10 and can be transmitted to server 30 via network 20. Configuration file 150 contains information regarding coordination points. For example, configuration 150 can identify the coordination points implemented in the computing system of FIG. 1A (not shown), and can include information regarding the total number of coordination points as well. For example, configuration file 150 can identify that a total of three coordination points are implemented in a distributed computing system. In one embodiment, configuration file 150 can be created by an administrator and/or user of client 10. Once generated by client 10, configuration file 150 can be transmitted to server 30 to be used by node 120 for identifying, for example, the total number of configuration points.

Figure 1B:
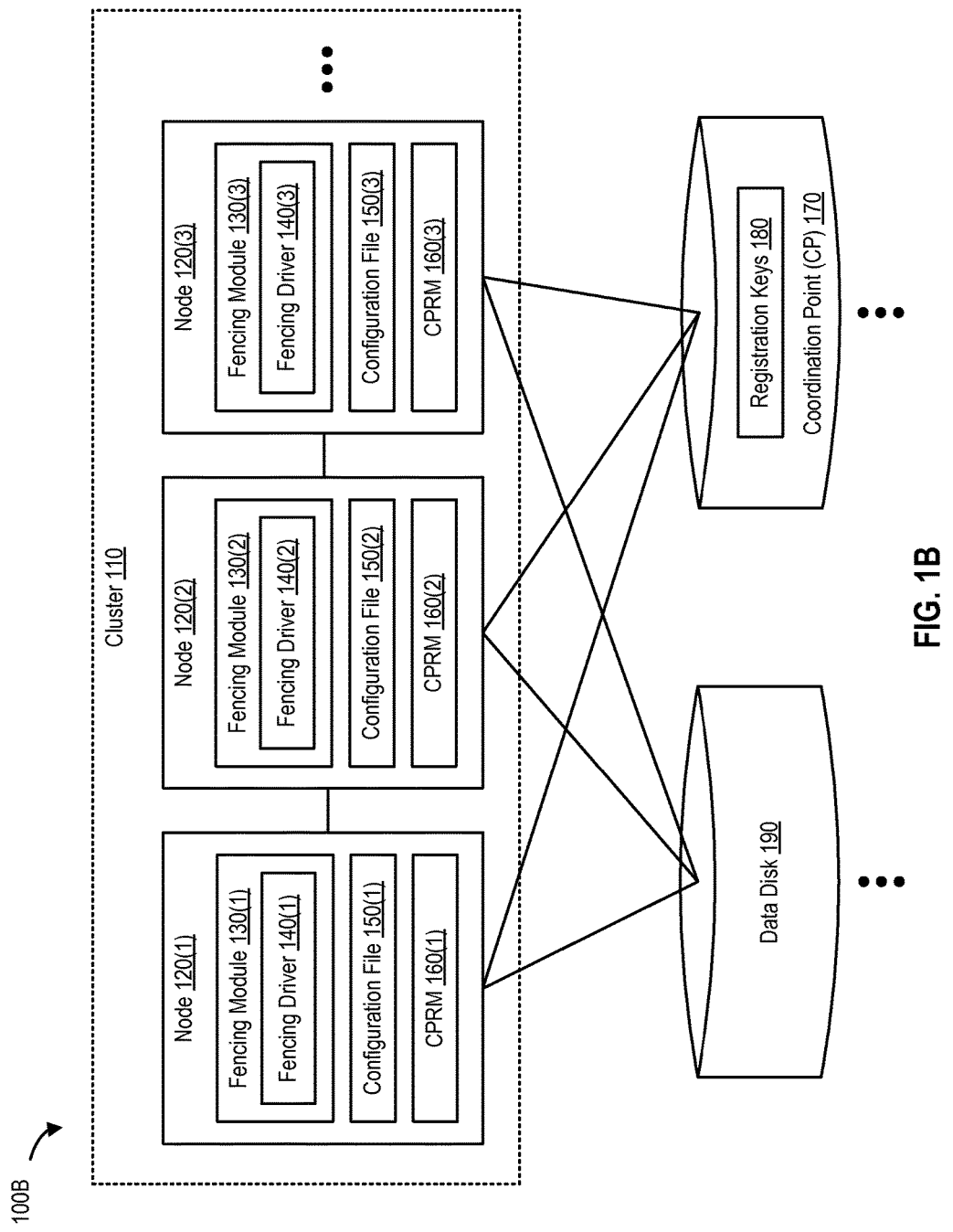
FIG. 1B is a block diagram of a high-availability cluster, according to one embodiment of the present disclosure.

FIG. 1B is a block diagram of an I/O fencing environment implemented with coordination point(s), according to one embodiment. As shown, cluster 110 includes nodes 120(1), 120(2), and 120(3). Node 120(1) implements fencing module 130(1), which further includes fencing driver 140(1). Node 120(1) also includes configuration file 150(1) and CPRM 160(1). Node 120(2) implements fencing module 130(2), which further includes fencing driver 140(2). Node 120(2) also includes configuration file 150(2) and CPRM 160(2). Similarly, node 120(3) implements fencing module 130(3), which further includes fencing driver 140(3). Node 120(3) also includes configuration file 150(3) and CPRM

160(3). As noted, a fencing module can be implemented on each node (e.g., by client 10). In some embodiments, the fencing module can be kernel module. Fencing modules 130(1)-(3) are responsible for ensuring valid and current cluster membership (or membership change) through membership arbitration (e.g., the arbitration process as described above).

In some embodiments, fencing modules 130(1)-(3) also register nodes 120(1)-(3) respectively, with coordination point (CP) 170. For example, fencing module 130(1), using fencing driver 140(1), can place (or install) a registration key identifying node 120(1) on coordination point 170. Similarly, fencing modules 130(2) and 130(3), using fencing drivers 140(2) and 140(3), each place (or install) a registration key identifying nodes 120(2) and 120(3) on coordination point 170, respectively. Therefore, registration keys 180 as shown in FIG. 1B, can include the registration keys of nodes 120(1)-(3). As shown, FIG. 1B also includes a data disk 190 (which is shared (as storage), by nodes 120(1)-(3)).

It should be noted that configuration files 150(1)-(3) of nodes 120(1)-(3) include the same information. For example, the number of coordination points identified by configuration files 150(1)-(3) is fixed and pre-configured. As a result, nodes 120(1)-(3) have access (or potential access) to the same number of coordination points.

Figure 2:
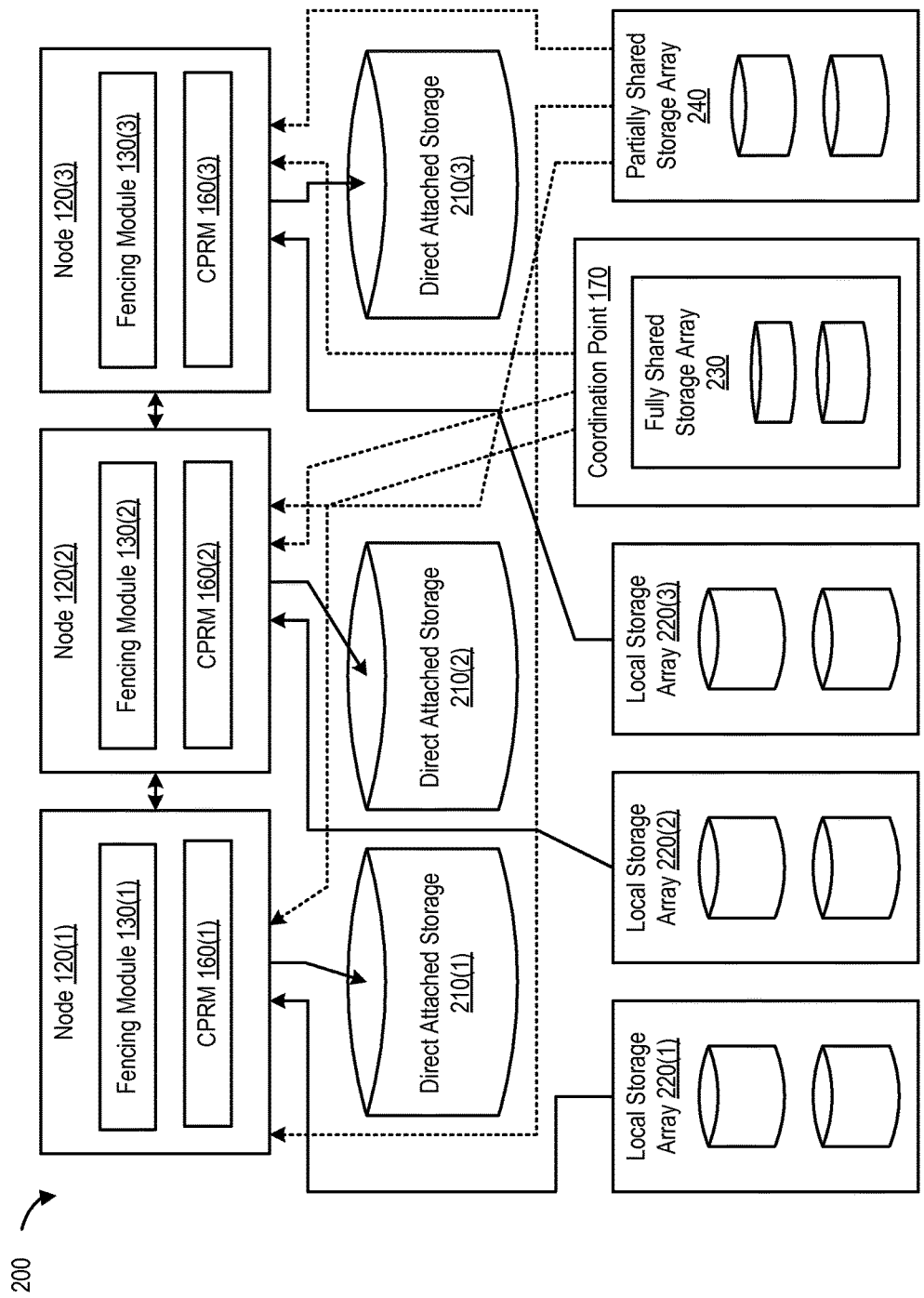
FIG. 2 is a block diagram of a high-availability cluster implemented in a distributed storage environment, according to one embodiment of the present disclosure.

FIG. 2 is a block diagram of a FSS system implementing a coordination point, according to one embodiment. As shown in FIG. 2, nodes 120(1)-(3) are each connected to Direct Attached Storage (DAS) 210(1)-(3) respectively. The FSS system of FIG. 2 also includes local storage arrays 220(1)-(3) associated with nodes 120(1)-(3), respectively, as well as a partially shared storage array 240. Coordination point 170 in FIG. 2 is a fully shared storage array 230. Therefore, coordination points can be used in FSS systems to enable cluster-wide sharing of local storage (e.g., DAS 210(1)-(3)). In this manner, networked shared storage can co-exist with physically shared storage.

In one embodiment, each of the nodes 120(1)-(3) require access to fully shared storage array 230. Although nodes in a FSS system do not require access to the same shared storage, I/O fencing requires a coordination point to be fully shared (by all the nodes in a cluster). Therefore, in this example, fully shared storage array 230 is chosen to be the coordination point.

Examples of Coordination Point(s)

As noted, coordination points can be implemented in a cluster to assist with fencing operations. Coordination points provide a lock mechanism to determine which node (or nodes) are allowed to fence off shared storage (e.g., data drives) from other nodes in the cluster. For example, a node must eject the registration key of a peer node from a coordination point before that node is allowed to fence the peer node from shared storage. Coordination points can be either disks or servers, or both. Typically, and in one embodiment, cluster 110 includes at least three (3) coordination points, which can be a combination of disks and/or servers.

Disks that function as coordination points are called coordinator disks. In one embodiment, coordinator disks are three (3) standard disks or LUNs (Logical Unit Numbers) set aside for I/O fencing during cluster reconfiguration (e.g., before a cluster is formed). Coordinator disks (and coordination points) do not serve any other storage purpose in a cluster (e.g., such as data storage or inclusion in a disk group for user data). Any disks that support SCSI-3 Persistent Reservation (SCSI-3 PR) can be coordinator disks. In another embodiment, a coordination point can also be a server called a coordination point server. A coordination point server is a software solution that runs on a remote computing system or cluster.

Therefore, regardless of whether a coordination point is a coordinator disk or a coordination point server, a coordination point permits node(s) in a cluster to at least: (1) register and become a member of a cluster, (2) determine which other nodes have successfully registered as members of the same cluster, (3) un-register from the cluster, and (4) forcefully un-register and preempt other nodes as members of the cluster.

In some embodiments, coordination points are, at a minimum, three (3) coordinator disks or coordination point servers (or any combination of the two) that act together as a global lock device because racing for control of these coordination points (e.g., in a fencing race) is used to determine cluster membership. Because control of a cluster is granted to a node that gains control of (or wins) a majority of coordination points, there must always exist an odd number of coordination points (e.g., any odd number combination of coordinator disks and/or coordination point servers). In one embodiment, a maximum of three (3) coordinator disks or coordination point servers (or any combination of the two) are implemented.

As previously noted, fencing can be used to make sure only one partition (or sub-cluster) survives in a cluster which has experienced network partition such that only the surviving partition is able to write to shared storage. Fencing uses a fencing race to determine which partition or sub-cluster gets to fence off the nodes in the other sub-cluster or partition. Because coordination points are used to manage access to shared storage, in one embodiment, the fencing race refers to nodes in different sub-clusters or partitions racing to gain access to (or reach) the majority of coordination points. Therefore, the fencing race refers to a partition or sub-cluster of nodes that has connectivity (or accessibility) to a majority of coordination points.

It should be noted that nodes in a sub-cluster (or partition) require access to a majority of coordination points because having just one coordination point available to a cluster can give rise to a single point of failure. For example, if a single coordination point fails for any reason, the cluster can lose operational capabilities. Further, using two (2) (or an even number of) coordination points (e.g., four (4), six (6), etc.) can result in a situation where no sub-cluster can definitively win a fencing race because node(s) in different sub-clusters can access (and win) the same number of, but albeit different, coordination points (e.g., in a situation where a cluster is partitioned into two sub-clusters with two (2) or four (4) available coordination points).

Therefore, using a single coordination point or an even number of coordination points can result in nodes in both sub-clusters writing data to shared storage, thus causing data corruption. Therefore, to keep a desired partition operational in a cluster that has been partitioned, a node in a sub-cluster, either alone or in combination with other nodes in that sub-cluster, must be able to access (and win) a majority of the coordination points available to the cluster (e.g., a task that can only be accomplished definitively in all situations if an odd number of coordination points are made available).

Coordination point(s) generally represents any type or form of computing device that is capable of performing or being used to perform fencing decisions (e.g., a coordination point 170 may be used to resolve split-brain scenarios for cluster 110 subsequent to a partition event). For example, coordination point 170 may represent one or more coordination disks and/or one or more coordination servers that can be used to determine fencing decisions. Examples of coordination point 170 include, without limitation, application servers and database servers configured to provide various database services and/or run certain software applications, storage devices (such as disks or disk arrays), laptops, desktops, cellular phones, personal digital assistants (PDAs), multimedia players, embedded systems, and/or combinations of one or more of the same.

Examples of Using a Coordination Point Reachability Matrix (CPRM)

In some embodiments, nodes in cluster 110 use a coordination point reachability matrix ("CPRM" or just "matrix") to exchange information about each node's accessibility (or reachability) to one or more coordination points provided to cluster 110. A CPRM includes information that identifies each node in the cluster, and also includes information to determine whether a node can access or reach one or more coordination points.

A CPRM can be generated by any node in the cluster, for example, by using fencing module 130 (as shown in FIG. 1A). The CPRM can also be replicated (and shared) across all nodes in the cluster such that the information provided by the CPRM is available to all the nodes. For example, fencing module 130(1) as shown in FIG. 2, can generate a CPRM (e.g., CPRM 160(1)) and replicate that CPRM across the remaining nodes in the cluster (e.g., as CPRM 160(2) on node 120(2), and CPRM 160(3) on node 130(3)).

Figure 3A:
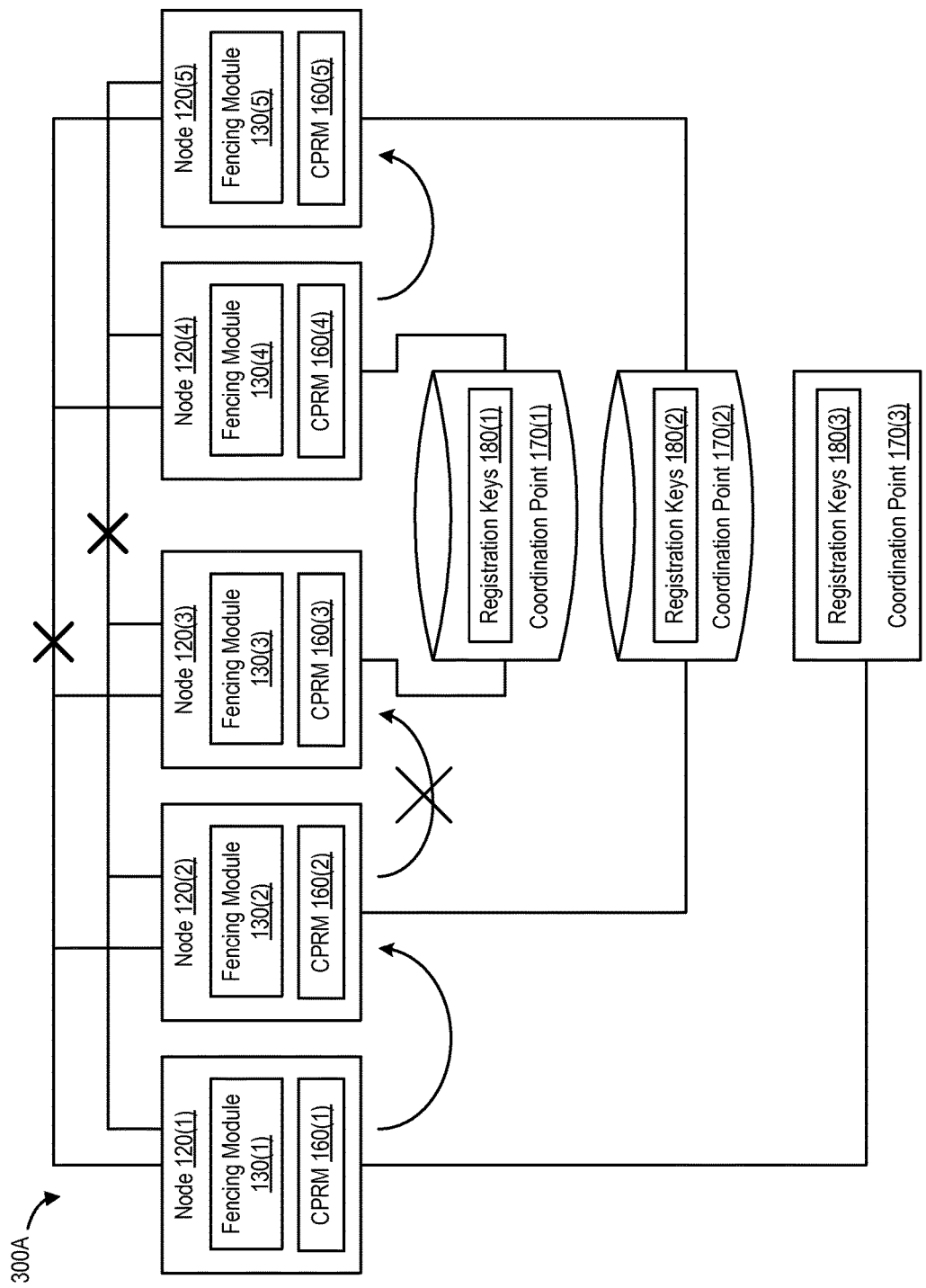
FIG. 3A is a block diagram of nodes in a cluster that perform fencing operations using coordination points, according to one embodiment of the present disclosure.

FIG. 3A is a block diagram of nodes in a cluster that perform fencing operations using coordination points, according to one embodiment. FIG. 3A includes five nodes: nodes 120(1), 120(2), 120(3), 120(4), and 120(5), and three coordination points: coordination points 170(1), 170(2), and 170(3). Each node either has or does not have connectivity to each of the coordination points 170(1)-(3). Each node also has a CPRM (shown as CPRM 160(1)-(5) corresponding to nodes 120(1)-(5), respectively).

Prior to performing a fencing race, a sub-cluster elects a racer node. A racer is a node that is designated by a sub-cluster to determine whether it can access one or more coordination points available to the cluster (as a whole). Typically, a racer node is chosen by the cluster (or designated) based on a node ID. However, it should be noted that other methods of choosing and/or designating a racer node other than by node ID are also contemplated.

In one embodiment, fencing module 130(1) generates a matrix (e.g., CPRM 160(1)).

The matrix includes information indicating accessibility of each coordination point by a first node (e.g., node 120(1)). Fencing module 130(1) then transmits the matrix to other nodes in the cluster. The matrix can be updated by each node in the cluster with the node's accessibility status to each coordination point, and the updated matrix can be replicated and shared across all the nodes in the cluster such that all nodes in the cluster have connectivity information (e.g., from the matrix) of each node to each coordination point.

In a scenario where a CPRM is not used, both sub-clusters of FIG. 3A would lose a fencing race. For example, FIG. 3A shows a network partition (indicated by two "X" signs) of a five (5) node cluster that creates two sub-clusters (or two partitions). Nodes 120(1)-(3) belong to a first sub-cluster, and nodes 120(4)-(5) belong to a second sub-cluster. In addition, nodes 120(1)-(5), can avail themselves of three (3) coordination points: coordination points 170(1)-(3).

As shown in FIG. 3A, the connectivity to cooirdination points 170(1)-(3) is not symmetric from all the nodes. For example, node 120(1) can only access coordination point 170(3), node 120(2) can only access coordination point 170(2), and node 120(3) can only access coordination point 170(1). As noted previously, nodes can successfully gain access to coordination points based on installing (or placing) their respectively registration keys on a given coordination point.

Upon network partition (as shown in FIG. 3A), the first sub-cluster (of nodes 120(1)-(3)) elects node 120(1) as the racer node (e.g., based on a node ID of node 120(1)). Because node 120(1) cannot reach (or access) more than half of the cooirdination points (e.g., because node 120(1) only has access to coordination point 170(3)), the first sub-cluster re-elects node 120(2) as the racer node. However, neither of the three (3) nodes in the first sub-cluster (nodes 120(1), 120(2), or 120(3)), each, individually have access to a majority of the coordination points.

The same situation can occur in the second sub-cluster. Neither node 120(4) nor 120(5) can each individually access a majority of the coordination points because node 120(4) can only access coordination point 170(1), and node 120(5) can only access coordination point 170(2). Therefore, if a CPRM is not used, both partitions (e.g., the first sub-cluster and the second sub-cluster) lose the partition race. Because no partition survives, total cluster outage can occur (e.g., all nodes panic and leave the cluster).

However, if a CPRM is implemented (e.g., CPRMs 160 (1)-(5)), the first sub-cluster wins the fencing race and the first sub-cluster's partition survives. For example, in one embodiment, the CPRM indicates the connectivity (or reachability) of each node in the cluster to each of the coordination points. Therefore, in the current example, after node 120(2) is re-elected as the racer node, the first sub-cluster, by accessing the CPRM (e.g., node 120(2) accesses CPRM 160(2) once re-elected as the racer node), can determine that nodes 120(1) and 120(2), in combination, have access to a majority of the coordination points (e.g., coordination points 170(2) and 170(3), respectively). Therefore, the re-election of node 120(3) as the racer node is not required (shown with an "X" in FIG. 3A), and the first sub-cluster wins the fencing race and survives. In this manner, the use of a CPRM can avoid unavailability resulting from network partition when coordination points are used for fencing operations.

Figure 3B:
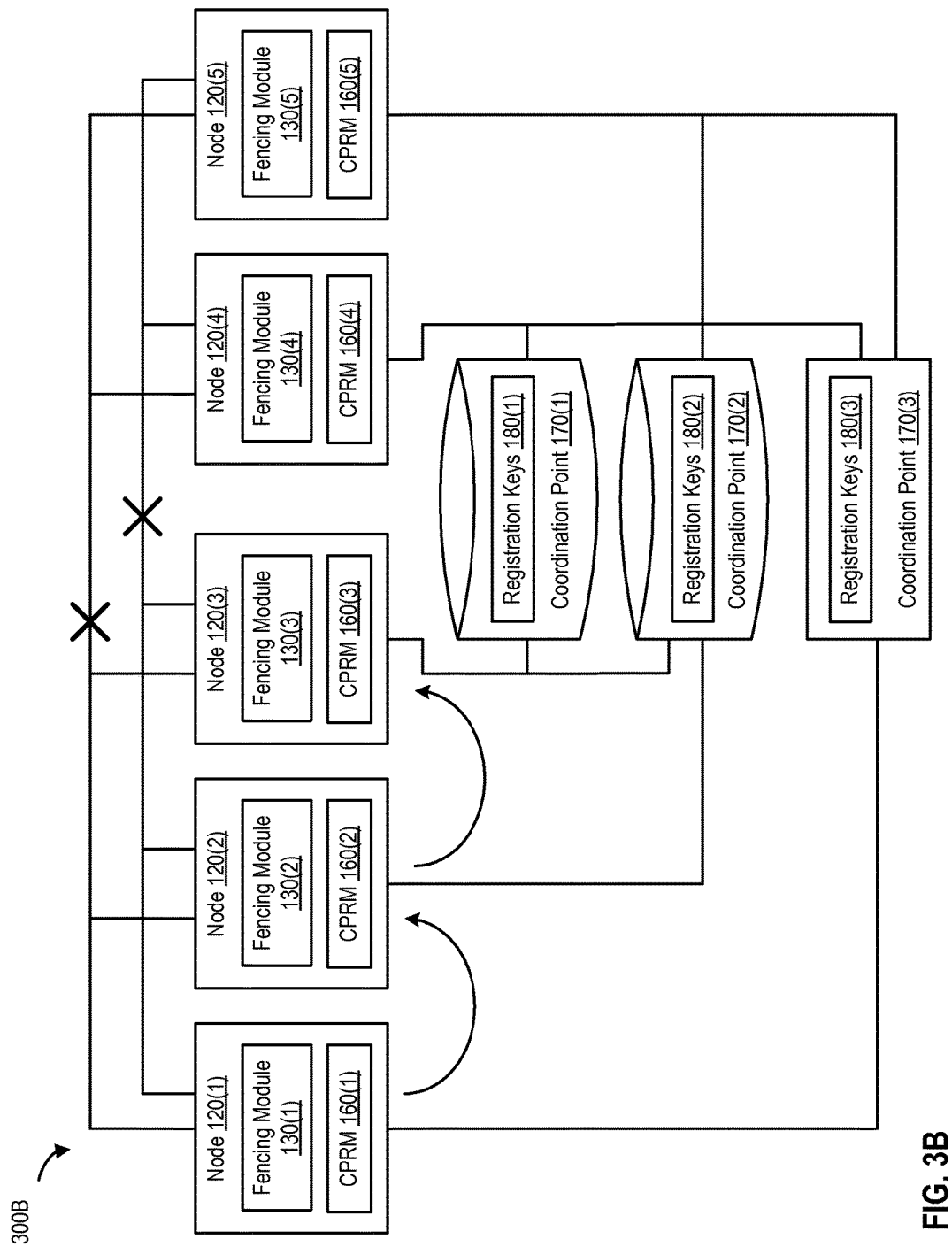
FIG. 3B is a block diagram of nodes in a cluster that perform fencing operations using coordination points, according to one embodiment of the present disclosure.

FIG. 3B is a block diagram of nodes in a cluster that perform fencing operations using coordination points, according to one embodiment. Like FIG. 3A, FIG. 3B illustrates a five (5) node cluster that undergoes network partition. As previously noted, one drawback of using coordination points to perform I/O fencing is that if a cluster is partitioned, the smaller partition (or sub-cluster) can end up winning a fencing race. This sub-optimal fencing race result is not desirable because a sub-cluster with a larger number of nodes must survive a fencing race upon network partition (e.g., to provide high availability, application failover, etc.).

Therefore, if a CPRM is not used, the second sub-cluster in FIG. 3B (e.g., the sub-cluster with nodes 120(4) and 120(5)) can end up winning a fencing race, thus causing the nodes in the more preferable first sub-cluster (e.g., nodes 120(1)-(3)) to panic and leave the cluster. For example, as shown in FIG. 3B, node 120(4) has access to coordination points 170(1) and 170(2), but node 120(1) only has access to coordination point 170(3). As previously noted, one method to select a racer node is by using a node's node ID. Therefore, in this example, node 120(1) is chosen a racer node for the first sub-cluster, and node 120(4) is chosen as a racer node for the second sub-cluster.

It should be noted that because node 120(1) does not have access to a majority of coordination points, the first sub-cluster re-elects node 120(2) as the racer node. However, node 120(4), which is chosen as a racer node by the second sub-cluster singlehandedly has access to a majority of coordination points (e.g., coordination points 170(1) and 170(2)). Therefore, racer re-election (e.g., to select node 120(5) as the racer node) is not required in the second sub-cluster, and the second sub-cluster can win the fencing race—an undesirable result.

Consequently, even if the second sub-cluster experiences a delayed start (e.g., if the second sub-cluster waits for the first sub-cluster to elect a racer node and start the fencing race before the second sub-cluster), the second sub-cluster wins the fencing race because the second sub-cluster does not require racer re-election. Unfortunately, if the first sub-cluster does not use a CPRM, the first sub-cluster loses the fencing race because the first sub-cluster has to go through multiple racer re-elections (or handoffs) until it can find a (healthy) racer node that can provide access to a majority of coordination points (e.g., node 120(3) as shown in FIG. 3B). Because the smaller partition survives, the cluster can experience unavailability (or low-availability).

Therefore, in one embodiment, a CPRM is used by the nodes in the cluster. As a result the re-election of node 120(3) by the first sub-cluster as a racer node (e.g., by node 120(2)) is not required, because nodes 120(1) and node 120(2) can each access the CPRM to determine that they have access to a majority of the coordination points (in combination) (e.g., coordination points 170(2) and 170(3), respectively). Therefore, the first (larger) sub-cluster wins the fencing race and is allowed to fence off the second (smaller) sub-cluster—a desired result.

Figure 4:
FIG. 4 is a table of a first coordination point reachability matrix (CPRM), according to one embodiment of the present disclosure.

FIG. 4 is a table of a coordination point reachability matrix (CPRM), according to one embodiment. As previously noted, in one embodiment, a CPRM can be generated by any node in the cluster (e.g., using a fencing module and/or a fencing driver), and, in another embodiment, can be replicated and shared across all the nodes in the cluster. In some embodiments, the CPRM is maintained atomically across the cluster, and the CPRM is updated and exchanged within the cluster each time a new node joins the cluster.

For example, until a new node joins the cluster, the reachability (or visibility and/or accessibility) of that new node to the various coordination points is unknown (by the other nodes in the cluster). However, when the new node joins a cluster, the new node broadcasts its reachability to the cluster by updating the CPRM. The CPRM is then shared, replicated, and/or exchanged with the other (active) nodes in the cluster. The new node is also provided a copy of the CPRM upon joining the cluster.

A CPRM (e.g., CPRM 160) can be used by each node in a cluster to determine whether one or more nodes in the cluster have access to a majority of coordination points, either alone or in combination with each other. As shown in FIG. 4, node 120(1) attempts to form a cluster (e.g., cluster 110). Because node 120(1) does not have access to any coordination points (let alone a majority of coordination points), node 120(1) is not permitted to form the cluster. Therefore, the result of node 120(1) attempting to form the cluster causes result 410 to indicate "No." The column for cluster members 420 and cluster snapshot 430 is also empty (or null). Similarly, node 120(2) is also not permitted to form the cluster because node 120(2) also cannot access a majority of the coordination points (e.g., node 120(2) can only access coordination points 170(1) and 170(2)). It should be noted that in the current example, nodes 120(3), 120(4), and 120(5), have not yet attempted to form the cluster.

It should be noted that, as shown in FIG. 4, five (5) coordination points are provided to any (potential) cluster that is to be formed (e.g., configuration file 150 indicates that five (5) coordination points are available). As shown in FIG. 4, a snapshot (e.g., cluster snapshot 430) is a list of all coordination points that are being used by the nodes in a cluster. In one embodiment, nodes 120(3) and 120(4) start up at the same time. If a CPRM is not used (or available), nodes 120(2) and 120(4) may not be permitted to form the cluster because nodes 120(3) and 120(4) cannot individually access a majority of coordination points.

However, in certain embodiments, nodes 120(3) and 120(4) can each generate their own CPRM when they start up and attempt to form a cluster. In this example, the CPRM for node 120(3) indicates that node 120(3) has access to coordination points 170(3) and 170(5). Similarly, the CPRM for node 120(4) indicates that node 120(4) has access to coordination point 170(4). Because nodes 120(3) and 120(4) are coming up together (e.g., starting up and attempting to form a cluster at the same time), nodes 120(3) and 120(4) generate and exchange their own CPRM (which they have generated) with each other. Based on a comparison of their respective CPRMs, nodes 120(3) and 120(4) can determine that they have access to (or can reach) a majority of coordination points, together. Therefore, in this manner, nodes 120(3) and 120(4) are together permitted to form the cluster.

Once nodes 120(3) and 120(4) together form and join the cluster, the CPRM is updated such that result 410 indicates "Yes," cluster members 420 indicates {3, 4}, and cluster snapshot 430 indicates "CDE." When node 120(5) attempts to join the cluster, node 120(5) is permitted to join the cluster without requiring node 120(5) to show that node 120(5) has access to a majority of coordination points because nodes 120(3) and node 120(4) already fulfill this requirement. Therefore, the CPRM is updated to indicate that node 120(5) has successfully joined the (running) cluster (e.g., result 410 is "Yes," cluster members 420 is {3, 4, 5}, and cluster snapshot 430 is "ABCDE"). At this point, because: (1) the cluster is up and running (e.g., the cluster is operational), and (2) the requirement that the majority of coordination points are reachable by one or more nodes, either alone or in combination, is fulfilled by nodes 120(3), 120(4), and 120 (5), nodes 120(1) and 120(2) are also permitted to successfully join the (running) cluster. In this example, the CPRM is updated each time a new node joins the cluster, and the CPRM is replicated/shared across all the nodes in the cluster each time the CPRM is updated.

Figure 5A:
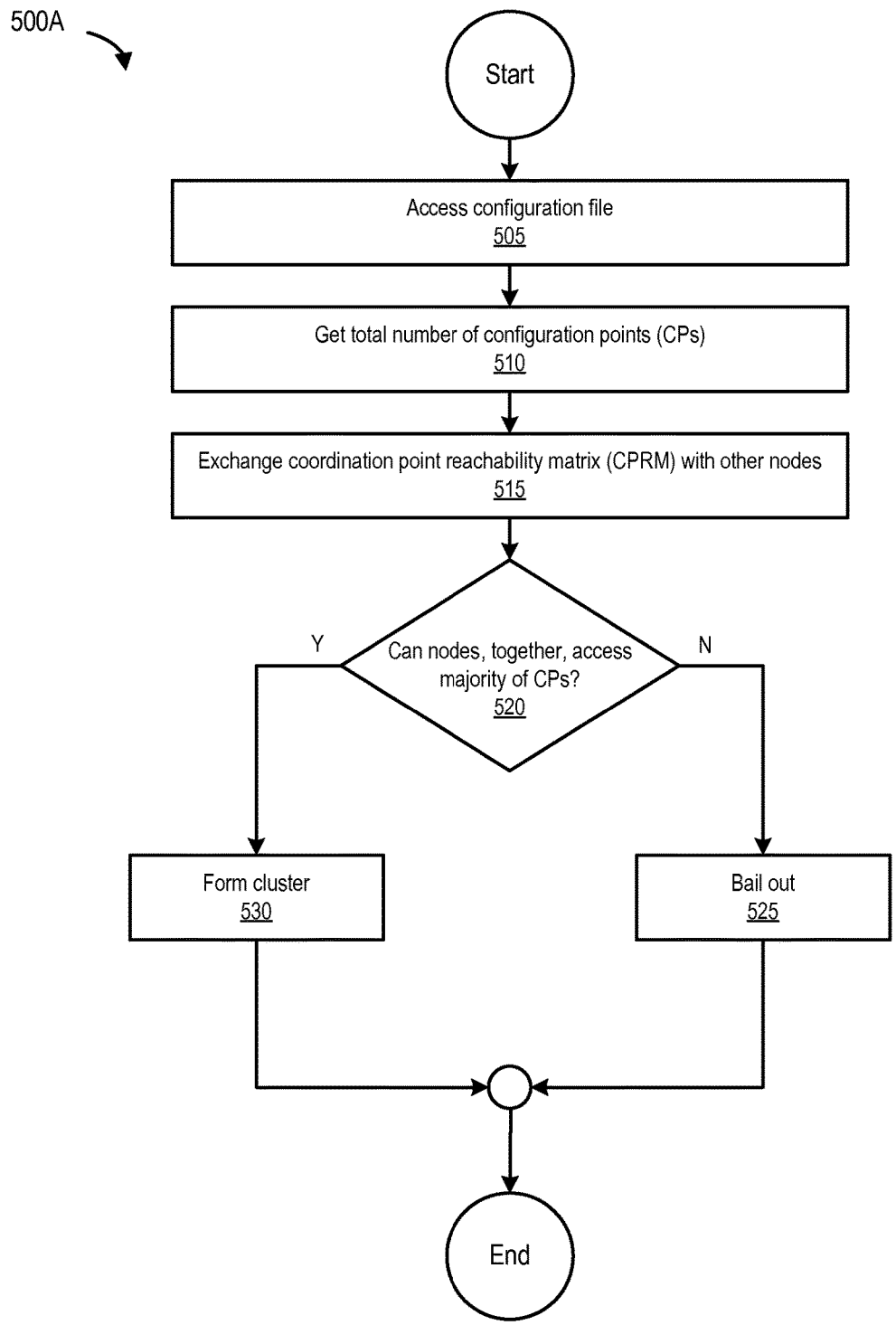
FIG. 5A is a flowchart of a process of a node forming and joining a cluster, according to one embodiment of the present disclosure.

FIG. 5A is a flowchart of a process for forming a cluster using a CPRM, according to one embodiment. The process begins at 505 by accessing a configuration file (e.g., node 120(1) accesses configuration file 150). At 510, the node (attempting to form a cluster), gets (or reads) the total number of (available) coordination points from the configuration file. At 515, the process exchanges a CPRM with other nodes, if such other nodes are also attempting to form and/or join the cluster (e.g., node 120(1) generates and exchanges CPRM 160(1) with other nodes that start up and attempt to form/join the cluster at the same time as node 120(1)).

At 520, the process determines whether the nodes, together, can access a majority of coordination points. If the nodes, together, cannot access (or reach) the majority of coordination points, the nodes panic, and at 525, bail out (e.g., nodes 120(1) and 120(2) as described above with respect with FIG. 4, before nodes 120(3) and 120(4) come up and attempt to form the cluster). However, if the nodes, together, can access (or reach) the majority of coordination points, the nodes, at 530, form the cluster (e.g., nodes 120(3) and 120(4) as shown in FIG. 4). The process then ends (e.g., with the formation of a cluster).

Figure 5B:
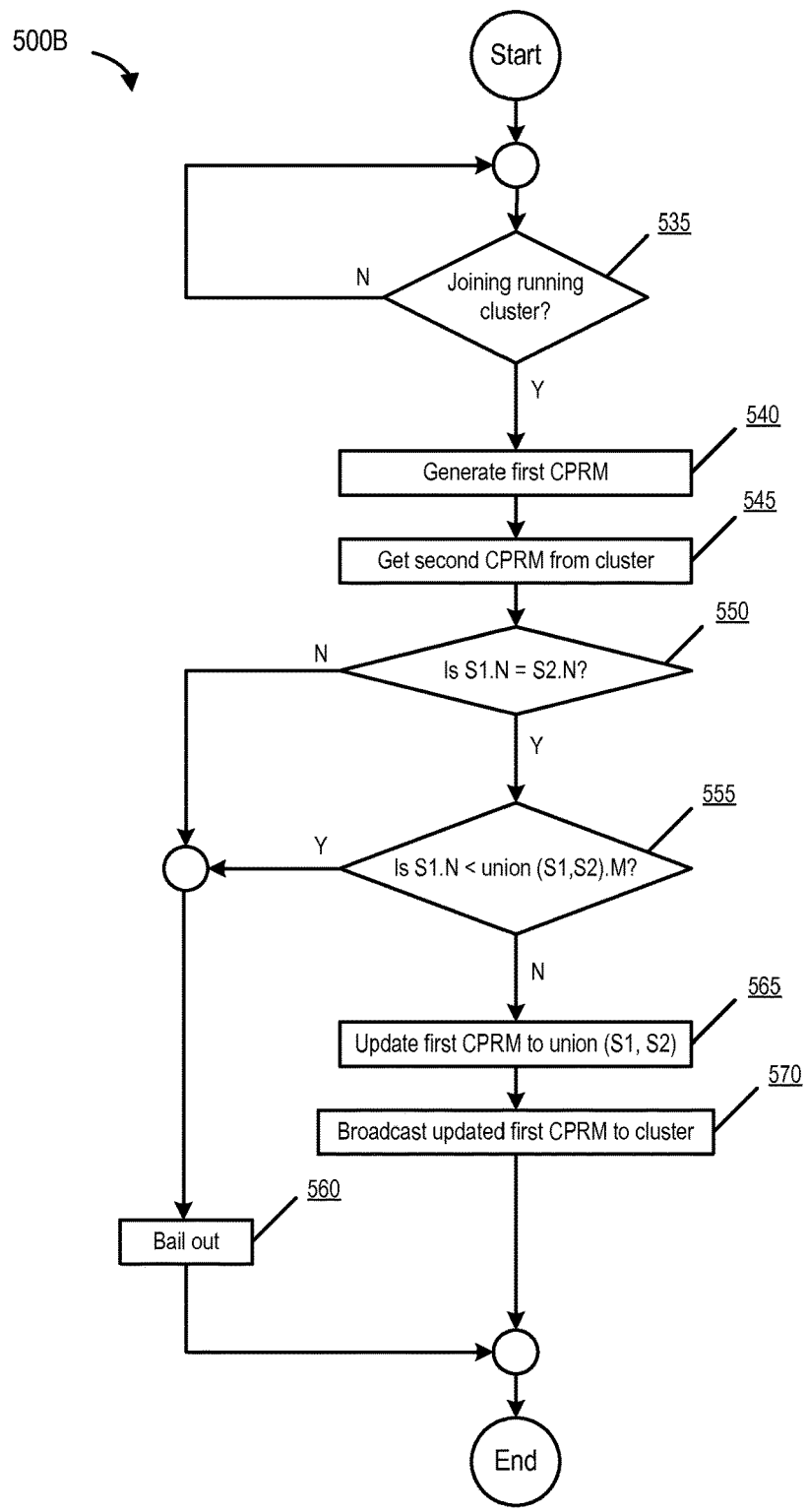
FIG. 5B is a flowchart of a process of a node joining a running cluster, according to one embodiment of the present disclosure.

FIG. 5B is a flowchart of a process for joining a running cluster, according to one embodiment. The process begins at 535 by determining whether a node is joining a running cluster. If the node is joining a running cluster, the process, at 540, generates a first CPRM (e.g., the node joining the cluster generates the first CPRM that indicates that node's accessibility to one or more available coordination points). At 545, the process gets (or requests) a second CPRM from the (running) cluster (e.g., the second CPRM can be retrieved or accessed from any node in the running cluster because the CPRM is replicated and shared across each node in the cluster). The second CPRM indicates the accessibility of each active node in the cluster to the one or more (available) coordination points. The process compares the first CPRM (generated by the node attempting to join the cluster) and the second CPRM (received from the cluster).

At 550, the process determines whether a first snapshot of the node attempting to join the cluster times the number of coordination points (S1.N) is equal to a second snapshot of the cluster times the number of coordination points (S2.N). If S1.N is not equal to S2.N, the node, at 560, panics and bails out (e.g., because S1.N not being equal to S2.N can indicate a potential error in cluster and/or coordination point configuration). As noted, N is the number of coordination points in a configuration file of a node. N can also be maintained in a CPRM of a node. The check of [S1.N≠S2.N] protects against a node joining a cluster with a misconfigured value of N in the node's configuration file.

However, if S1.N is equal to S2.N, the process, at 555, determines whether the first snapshot (of the node attempting to join the cluster) times the number of coordination points (e.g., S1.N), is less than the union (or combination and/or total of) the first snapshot and the second snapshot (of the cluster) times the number of coordination points (e.g., union (S1, S2).M). If S1.N is less than (S1, S2).M, the node, at 560, panics and bails out. However, if S1.N is greater than or equal to (S1, S2).M, the process, at 565, updates the first CPRM (generated by the node attempting to join the cluster) to the union of (S1, S2). At 570, the process ends by broadcasting the (updated) first CPRM to the cluster (e.g., to the other nodes in the cluster). Upon receiving the broadcasted (and updated) first CPRM, the second CPRM is also updated (e.g., the second CPRM incorporates the information in the updated first CPRM) and a single (up-to-date and comprehensive) CPRM (which is representative of the entire cluster) is replicated and shared across all the nodes in the cluster.

In the above example, M refers to the total number of coordination points that are visible (or accessible by) the cluster as a result of the union operation (e.g., (S1, S2).M). This check or operation protects against a node joining a cluster with coordination points that are different than coordination points that are configured for the cluster (e.g., by an administrator). For example, if a second node attempts to join the cluster with an N value of 7, the second node will not be able to join the cluster because the first check (550) will fail because S1.N is 7 and S2.N is 5. If a third node tries to join the cluster with an N value of 5, and the third node has access to two coordination points {D, E}, the cluster cannot access those coordination points (yet). Therefore, the union of the two CPRMs will result in a cluster snapshot of {ABCDE}. The check 555 fails because N is 5 and M is also 5. Hence node 3 will join the cluster. However, if a fourth node tries to join with an N value of 5, and the fourth node claims has access to two coordination points {F, G}, the union (555) in this example will result in a cluster snapshot of {ABCDEFG} and the M value will be 7. The check 555 passes in this case because N is 5 and M is 7 and node 4 will not join the cluster.

In this manner, one or more CPRMs can be generated and implemented by nodes to form a new cluster and/or join an existing cluster that uses coordination points to perform I/O fencing. In addition, using a CPRM to perform I/O fencing in environments that implement coordination points, addresses, among other challenges: (1) unavailability caused by a fencing race, and (2) sub-optimal fencing race results, as noted above.

Examples of Preventing Data Corruption Due to Pre-Existing Split Brain

Despite the advantages, implementing a CPRM in the manner described above, however, can result in at least couple of additional challenges and/or drawbacks. First, if a node leaves (or exists) a running cluster for any reason, the remaining nodes in the cluster may lose access to the majority of coordination points (e.g., to half or more of the coordination points). For example, the node that leaves or exists the cluster may have provided access to at least one coordination point, and therefore may have been necessary to satisfy the requirement of accessing the majority of coordination points, either alone or in combination (with the remaining nodes in the cluster). Therefore, upon another (or the next) partitioning event (e.g., a network partition), the remaining nodes in the cluster (e.g., in newly formed sub-clusters) may not be able to successfully win a fencing race without the leaving node. Such a situation can cause unavailability of the cluster.

Second, if a node leaves (or exists) a cluster that has already been partitioned for any reason (e.g., the cluster is in a partitioned state), there may exist a situation where nodes that are part of the cluster and were previously inactive (e.g., these nodes were not started or active earlier), may boot up (or start up). In such a situation, such previously inactive nodes of the cluster that become active will come up (or join the cluster) in a partitioned state (e.g., there may exist no common coordination points between nodes in the two partitions). As a result, the nodes that join the cluster in a partitioned state cannot identify the registration keys of the other nodes on the coordination points, and will assume that there is no pre-existing split brain. If these nodes boot up or come up, data written by these nodes to shared storage can cause data corruption.

Therefore, in certain embodiments, in response to determining that a node is no longer part of a sub-cluster, another node in the sub-cluster is designated as a racer node (e.g., the sub-cluster elects the racer node based on Node ID). In this example, the racer node accesses a matrix (e.g., a CPRM). The matrix includes information to determine whether a majority of coordination points in a cluster are accessible by nodes in the sub-cluster. Based on the accessing, the racer node makes a determination that the information indicates that the majority coordination points are accessible by the nodes (in the racer node's sub-cluster). The information is then broadcasted to the other nodes in the cluster by the racer node.

In one embodiment, after determining that a node is no longer part of a sub-cluster, and prior to designating another node in the sub-cluster as the racer node, the remaining nodes in the sub-cluster can determine that no nodes in the sub-cluster can individually provide access to the majority coordination points (e.g., by accessing a CPRM that is replicated and shared across the nodes in the sub-cluster).

In other embodiments, broadcasting the information (to the cluster) includes updating the matrix (e.g., the CPRM) with information indicating that a majority of coordination points are accessible by one or more nodes in the sub-cluster. The information can also indicated that a fencing race performed by the racer node is successful. Based on this information, the cluster can inhibit a partitioned node from accessing one or more coordination points accessible by the nodes in the sub-cluster. In this example, the inhibiting prevents a pre-existing split brain condition from occurring in the cluster.

Figure 6:
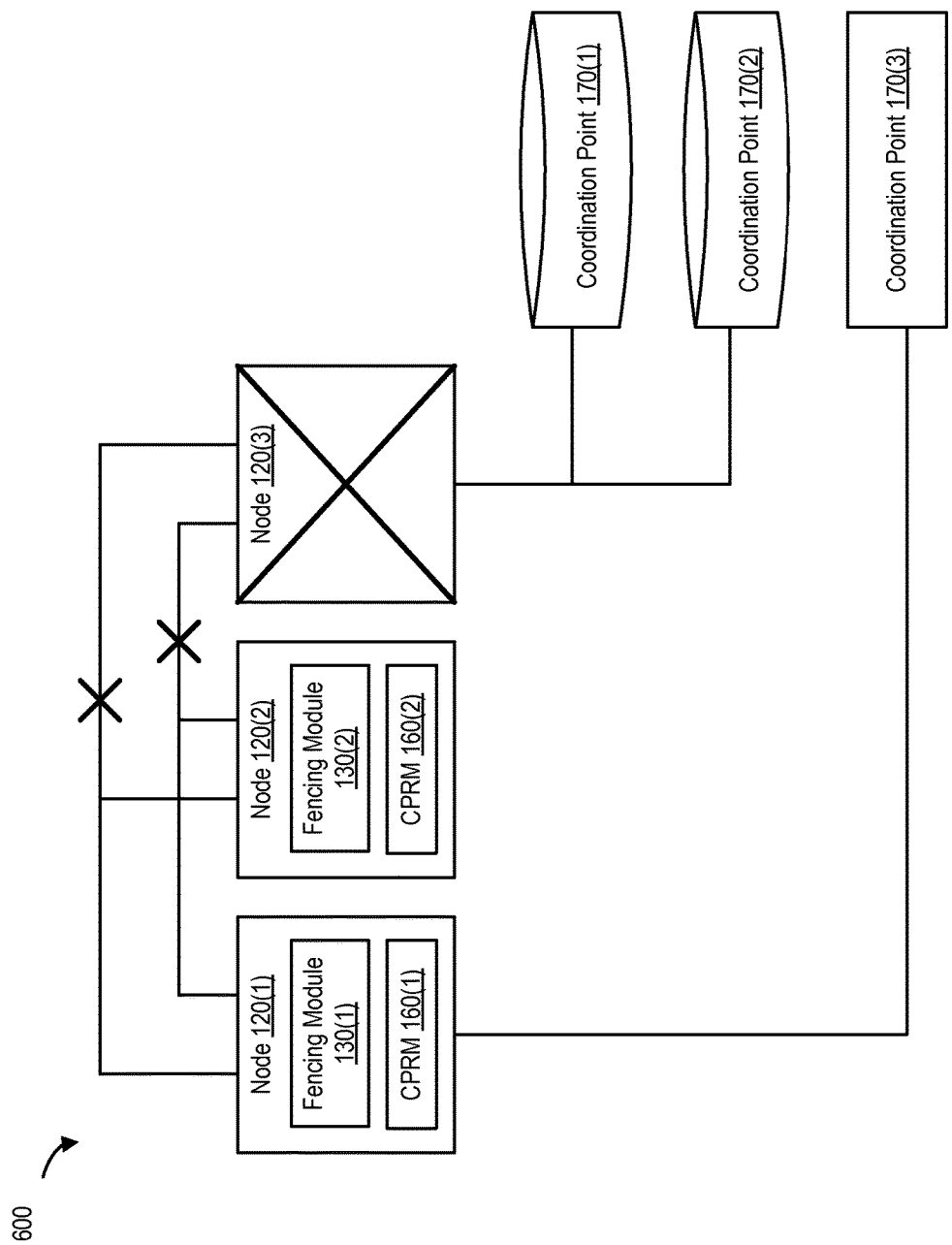
FIG. 6 is a block diagram of a node leaving a cluster, according to one embodiment of the present disclosure.

FIG. 6 is a block diagram of a node leaving a cluster, according to one embodiment. As shown in FIG. 6, the cluster has three (3) nodes (e.g., nodes 120(1), 120(2), and 120(3)), and three (3) coordination points (e.g., coordination points 170(1), 170(2), and 170(3)). If node 120(3) shuts down, panics, leaves, and/or exists the cluster for any reason, nodes 120(1) and 120(2), either alone or in combination, do not have access to a majority of coordination points (e.g., because node 120(3) singlehandedly provided access to coordination points 170(1) and 170(2)). In such a situation, when a network partition occurs (e.g., between node 120(1) and 120(2), neither node (or racer) will be able to win a fencing race. As a result, both nodes 120(1) and 120(2) can panic and leave the cluster, leading to complete cluster outage.

Figure 7:
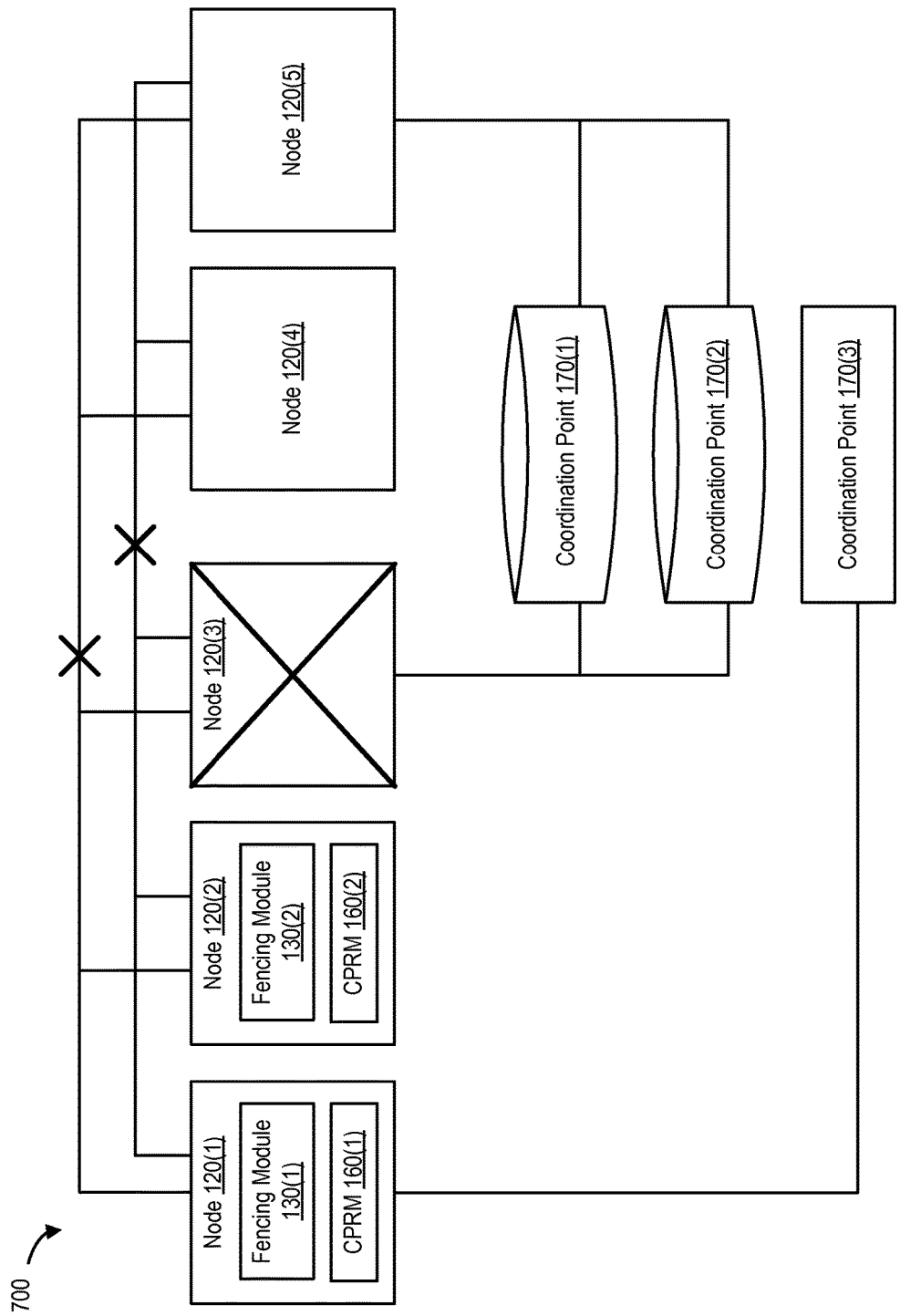
FIG. 7 is a block diagram of a cluster with a pre-existing split brain condition, according to one embodiment of the present disclosure.

FIG. 7 is a block diagram of a cluster with a pre-existing split brain condition, according to one embodiment. As shown in FIG. 7, node 120(3) leaves the sub-cluster of nodes 120(1), 120(2), and 120(3) for some reason. However, the cluster keeps running and nodes 120(4) and 120(5), which were previously inactive, come up in a partitioned state. Because node 120(3) has left the cluster, there are no common configuration points between a first partition of nodes 120(1) and 120(2), and a second partition of nodes 120(4) and 120(5). Therefore, nodes 120(4) and 120(5) are unable to determine that the cluster is already partitioned (e.g., because they cannot access coordination point 170(3) to determine that coordination points 170(3) includes the registration key of node 120(1)). As a result, data corruption can occur if nodes 120(4) and 120(5) join the cluster.

Figure 8:
FIG. 8 is a table of a CPRM that illustrates a node that has left a cluster, according to one embodiment of the present disclosure.

FIG. 8 is a table of a CPRM that illustrates a node that has left a cluster, according to one embodiment. It should be noted that the challenges described with reference to FIGS. 6 and 7 arise because of CPRM implementation. For example, because a CPRM permits a node to form and join a cluster without having connectivity, accessibility, and/or reachability to all the coordination points, a node leaving a cluster can cause the challenges described with reference to FIGS. 6 and 7. FIG. 8 illustrates CPRM 160 and shows that node 120(2) has left the cluster. For example, node 120(2) broadcasts a message to nodes 120(1), 120(3), 120(4), and 120(5). The messages indicates that node 120(2) has left the cluster. As a result, nodes 120(1), 120(3), 120(4), and 120(5) clear the state of the leaving node (e.g., node 120(2)) in their respective state machines as well as data structures.

CPRM 160 of FIG. 8 can be implemented to solve the challenges described above with reference to FIGS. 6 and 7. For example, in one embodiment, each node maintains a CPRM. The CPRM is generated by any node which comes up first in the cluster (e.g., a node which is the first node to form and/or join the cluster). The CPRM is updated and exchanged within the cluster each time a new node joins the cluster. In FIG. 8, "0" indicates that a coordination point is not reachable from a given node, and "1" indicates that a coordination point is reachable from a given node. When a node leaves a cluster (e.g., upon a graceful exit of a node), the cluster chooses (or selects and/or designates) a racer node (or simply, a racer). The racer determines whether the nodes in the racer's own partition (or sub-cluster) can reach (or access) a majority of coordination points (either alone or in combination). In FIG. 8, nodes 120(3), 120(4), and 120(5), can, together, access the majority of coordination points.

If the nodes in the racer's own partition (or sub-cluster) cannot reach (or access) a majority of coordination points, the racer declares a lost (fencing) race (and the nodes in the cluster panic and leave the cluster). However, if the nodes in the racer's own partition (or sub-cluster) can indeed reach (or access) a majority of coordination points (as shown in FIG. 8), the racer declares a won (fencing) race, and the cluster keeps running (e.g., stays operational).

If node 120(2) is rebooted and attempts to join the cluster, node 120(1) can be chosen a racer, and node 120(1) (acting as a racer) can determine that three (3) out of the five (5) coordination points are accessible or reachable by the cluster (as a whole) (e.g., by nodes 120(3), 120(4), and 120(5)). As a result, node 120(2) (which is a partitioned node) cannot come up (e.g., node 120(2) will be prevented from joining the cluster) because node 120(2) will fail pre-existing split brain detection. Therefore, in this manner, data corruption can be avoided.

Figure 9:
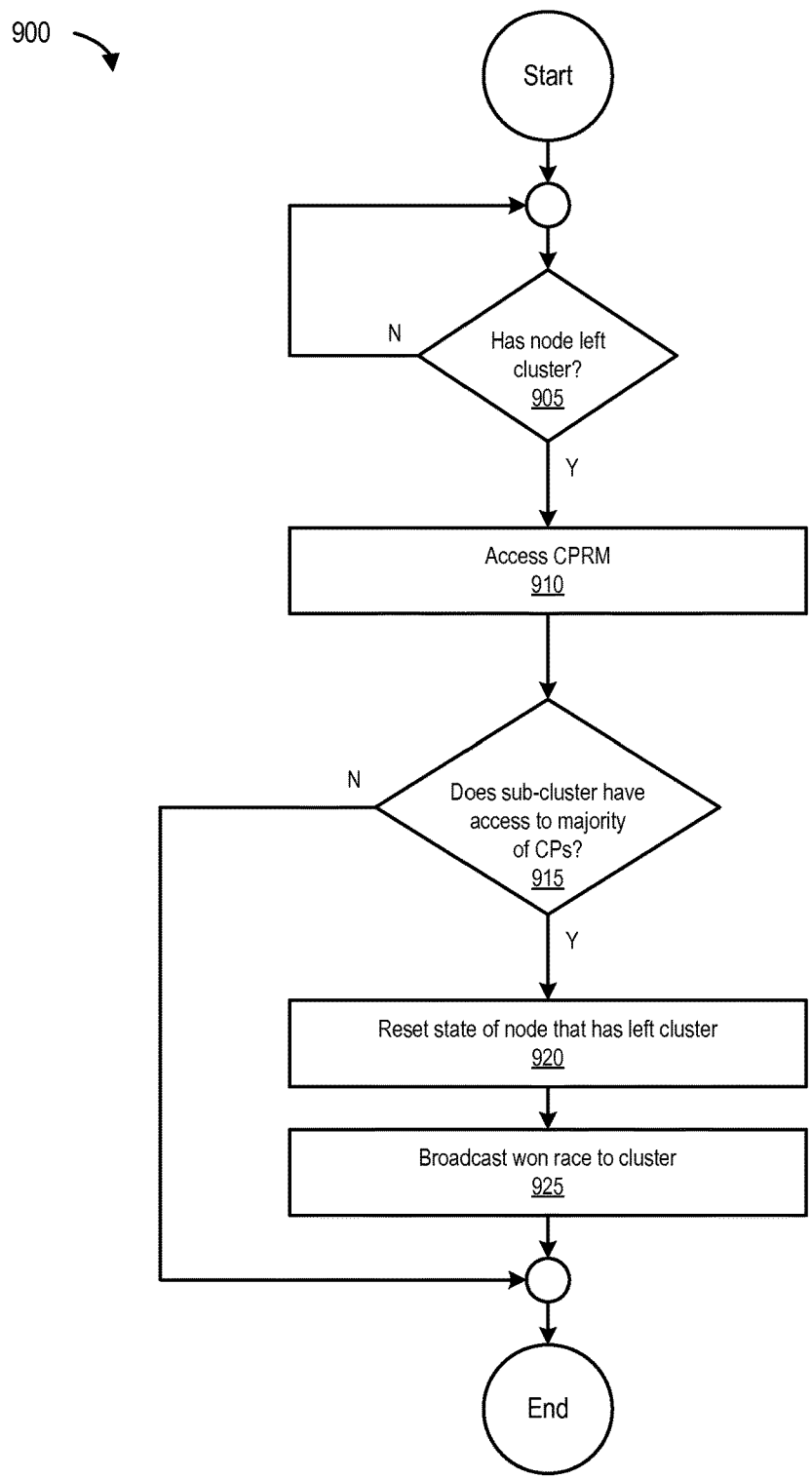
FIG. 9 is a flowchart of a process for preventing data corruption due to pre-existing split brain, according to one embodiment of the present disclosure.

FIG. 9 is a flowchart of a process for preventing data corruption due to pre-existing split brain, according to one embodiment. The process begins at 905 by determining whether a node has left a cluster (e.g., whether the node has shutdown gracefully). At 910, the process accesses a CPRM. For example, a racer node can be designated by the cluster to access the CPRM. At 915, the process determines whether the sub-cluster (e.g., the sub-cluster that is associated with the leaving node) has access to a majority of coordination points (e.g., whether the remaining nodes in the sub-cluster have access to the majority of coordination points, either alone or in combination). If the sub-cluster does not have access to the majority of coordination points, the racer node can broadcast a lost (fencing) race to the other nodes in the sub-cluster. Upon receiving the broadcast of the lost (fencing) race, the other nodes in the sub-cluster panic and exit the cluster.

However, if the sub-cluster does indeed have access to the majority of coordination points, the process, at 920, resets the leaving node's state (e.g., in each remaining node's state machines and data structures), and ends at 925, by broadcasting a won (fencing) race. If a partitioned node attempts to join the cluster, the partitioned node fails pre-existing split brain detection because at least one coordination point (called an overlapping coordination point(s)) is now common between the remaining nodes in the cluster and the partitioned node. As a result, the partitioned node is alerted to the existing partition in the cluster. In this manner, the process of FIG. 9 prevents data corruption associated with pre-existing split brain.

An Example of Optimizing Partition Arbitration

In one embodiment, a CPRM can be used to optimize partition arbitration by making the outcome of a fencing race depend on cumulative race results of each racer in a partition. For example, in one embodiment, in response to a cluster being partitioned into a two or more network partitions, a first node in a first network partition (of the two or more network partitions) is used to determine whether the first node wins one or more coordination points. In this example, the determination (whether the first node is successful in winning one or more coordination points) is transmitted (or broadcasted and/or communicated) from the first node to a second node (also in the first network partition). The second node is used to determine whether the second node wins one or more coordination points that are different than the one or more coordination points won by the first node.

In some embodiments, the outcome of a fencing race can be made to depend on cumulative race results of each racer in a partition because, for example, the second node can determine whether the first node and the second node together win a majority of coordination points. In this manner, a new racer (e.g., the second node) effectively resumes the fencing race on the remaining coordination points (e.g., one or more coordination points that are different than the one or more coordination points won by the first node).

In certain embodiments, winning one or more coordination points includes accessing the one or more coordination points, ejecting one or more registration keys of one or more nodes not in the first network partition from the one or more coordination points, and thus, preempting the one or more nodes from winning the one or more coordination points.

In other embodiments, cumulative race results from two or more nodes can be transmitted to another node. For example, the determination of the second node can be transmitted to a third node (in the first network partition), for example, if the first node and the second node together do not win the majority of coordination points.

FIG. 10A is a table of a CPRM that illustrates a network partition in a cluster, according to one embodiment, and FIG. 10B is a Bitwise OR table that also illustrates a network partition in a cluster, according to another embodiment. In FIGS. 10A and 10B, "0" indicates that a coordination point is not reachable from a given node (or a partition of nodes), and "1" indicates that a coordination point is reachable from a given node (or a partition of nodes).

As previously noted, each partition can elect a racer node to win one or more coordination points (e.g., a fencing race). In one embodiment, if a racer determines that it cannot eventually win a fencing race, the racer can declare a lost race before it even races for control of any coordination points. The racer can make this determination by accessing CPRM 160 as shown in FIG. 10A (e.g., by consulting the CPRM and determining that the nodes in the partition or sub-cluster, together, do not have access to a majority of coordination points, thus defeating the purpose of racing for control (or winning) any one coordination point). In this manner, a CPRM can provide faster fencing race results by forcing a loser partition to exit the cluster early, thus speeding up the cluster's operation.

In addition, using a CPRM that indicates a network partition (and the nodes in each partition or sub-cluster) (e.g., as shown in FIG. 10A) can lead to lesser handoffs and racer reelection(s). For example, it may not be necessary to handoff the racer node's role from one node to another node (e.g., via racer reelection) if it can be determined, early on, that the nodes in a partition or sub-cluster, either alone or in combination, do not have access to a majority of coordination points.

For example, in FIG. 10A, node 120(1) can be elected or designated as a racer node for a first sub-cluster (e.g., nodes 120(1) and 120(2)). Node 120(1) only races for coordination point 170(5) (e.g., because node 120(1) does not have access to the other coordination points as indicated by CPRM 160). After winning coordination point 170(5), node 120(2) is elected as the racer node (via racer reelection and because node 120(1) cannot win a majority of coordination points). However, the fact that node 120(1) has already won coordination point 170(5) can be used by node 120(2) to produce faster fencing race results. This important information need not be wasted and/or unused.

Therefore, the determination that node 120(1) has already won coordination point 170(5) is transmitted to node 120(2) by node 120(1) during racer reelection. As a result, node 120(2) only races to win two (2) more coordination points (e.g., coordination points 170(1) and 170(2)) because node 120(1) has already won coordination point 170(5)—thus winning the majority of coordination points. Therefore, once node 120(2) wins coordination points 170(1) and 170(2), node 120(2) can declare a won race without racing any further. In this manner, node 120(2) can resume a fencing race on coordination points not won by another node in the partition or sub-cluster leading to faster fencing race results.

Similarly, node 120(3) can be elected or designated as a racer node by a second sub-cluster (e.g., nodes 120(3), 120(5), and 120(5)). Because node 120(3) has access to and can win a majority of coordination points (e.g., coordination points 170(3), 170(4), and 170(5)), racer reelection is not required (and avoided) by the second sub-cluster. In this manner, a cluster has a better chance of survival because the majority of coordination points must be reachable or accessible from the sub-cluster as a whole, not individual nodes.

Figure 11A:
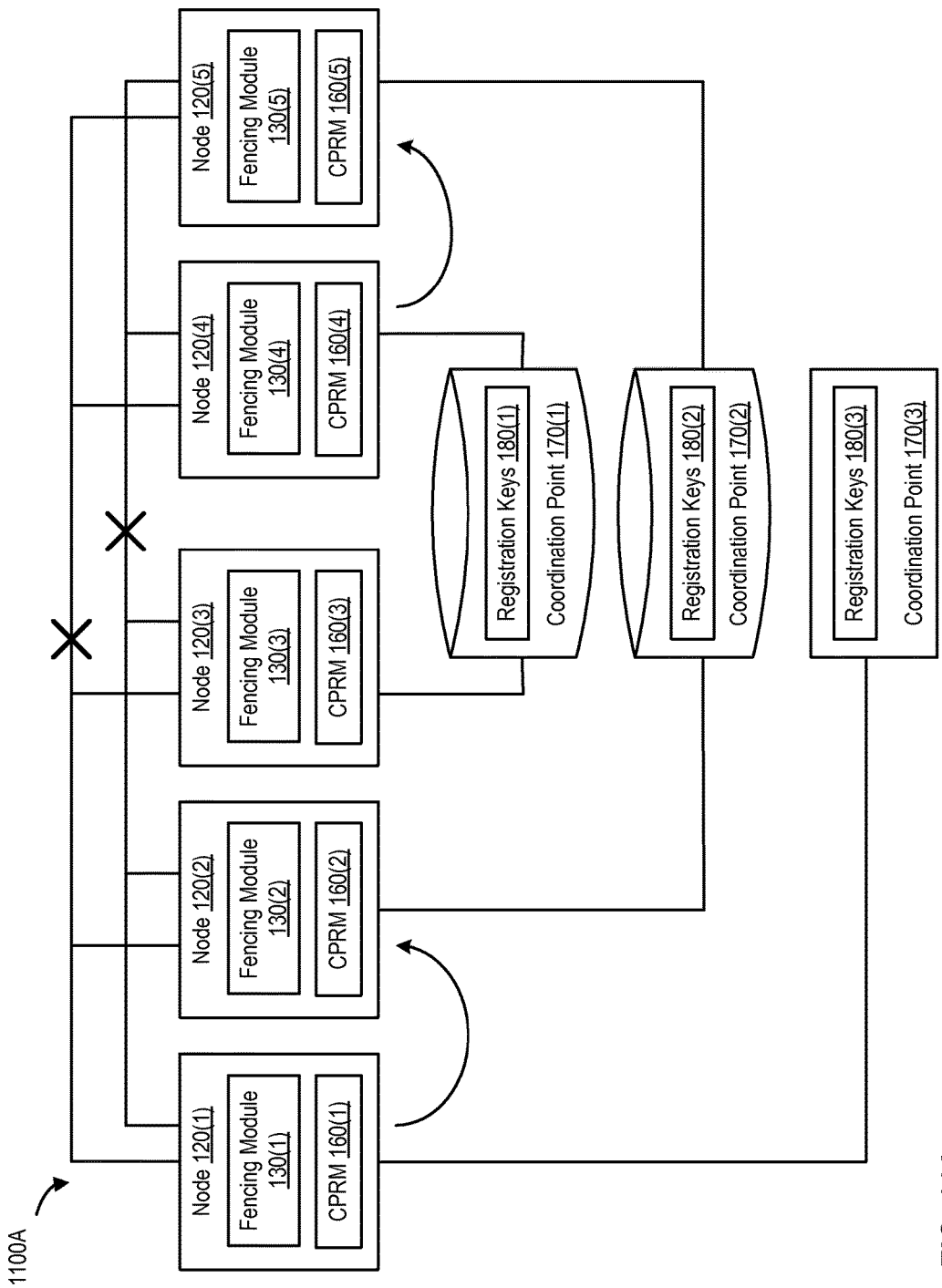
FIG. 11A is a block diagram of nodes in a partitioned cluster performing a fencing race, according to one embodiment of the present disclosure.

FIG. 11A is a block diagram of nodes in a partitioned cluster performing a fencing race, according to one embodiment. In this example, the outcome of a fencing race depends upon cumulative race results of each racer node in a partition (or sub-cluster). As shown in FIG. 11A, node 120(1) is elected as a racer node. Because node 120(1) only has access to coordination point 170(3), a first sub-cluster (e.g., nodes 120(1), 120(2), and 120(3)) has to reelect node 120(2) as the racer node. However, before node 120(1) hands-off the racer node role to node 120(2), node 120(1) wins coordination point 170(3) because node 120(1) has access to coordination point 170(3). In addition, node 120(1) transmits information to node 120(2) that node 120(1) has won coordination point 170(3). At this point, node 120(2) resumes the fencing race using the cumulative results of a previous fencing race provided to node 120(2) by node 120(1). Node 120(2) wins coordination point 170(2) and declares a won race because node 120(2) has information that indicates that the nodes in the first sub-cluster have won a majority of coordination points. A racer reelection of node 120(3) is unnecessary.

Similarly, node 120(4) is elected as a racer node in a second sub-cluster (e.g., nodes 120(4) and 120(5)). Node 120(4) has access to and wins coordination point 170(1) because no nodes in the sub-cluster raced for coordination point 170(1) (e.g., the nodes in the first sub-cluster (e.g., nodes 120(1), 120(2), and 120(3)) won the fencing race without having to race for coordination point 170(1)). Therefore, although node 120(4) wins coordination point 170(1), node 120(4) (and for that matter node 120(5)) will not (and cannot) win coordination point 170(2) (e.g., because coordination point has already been won by node 120(2); the registration key of nodes 120(4) and 120(5) has been ejected from coordination point 170(2) by node 120(2)). In addition, because nodes 120(4) and 120(5) do not have access to coordination point 170(3), the second sub-cluster will lose the fencing race (e.g., even if node 120(5) is reelected as a racer node). Therefore, the first sub-cluster wins the fencing race and stays in the cluster and nodes 120(4) and 120(5) in the second sub-cluster panic themselves and leave the cluster (e.g., bail out). In this manner, requiring the outcome of a fencing race (for winning coordination points) to be dependent on cumulative race results of a previous racer node prevents previously identified problems associated with a pre-existing split brain caused by network partition.

Figure 11B:
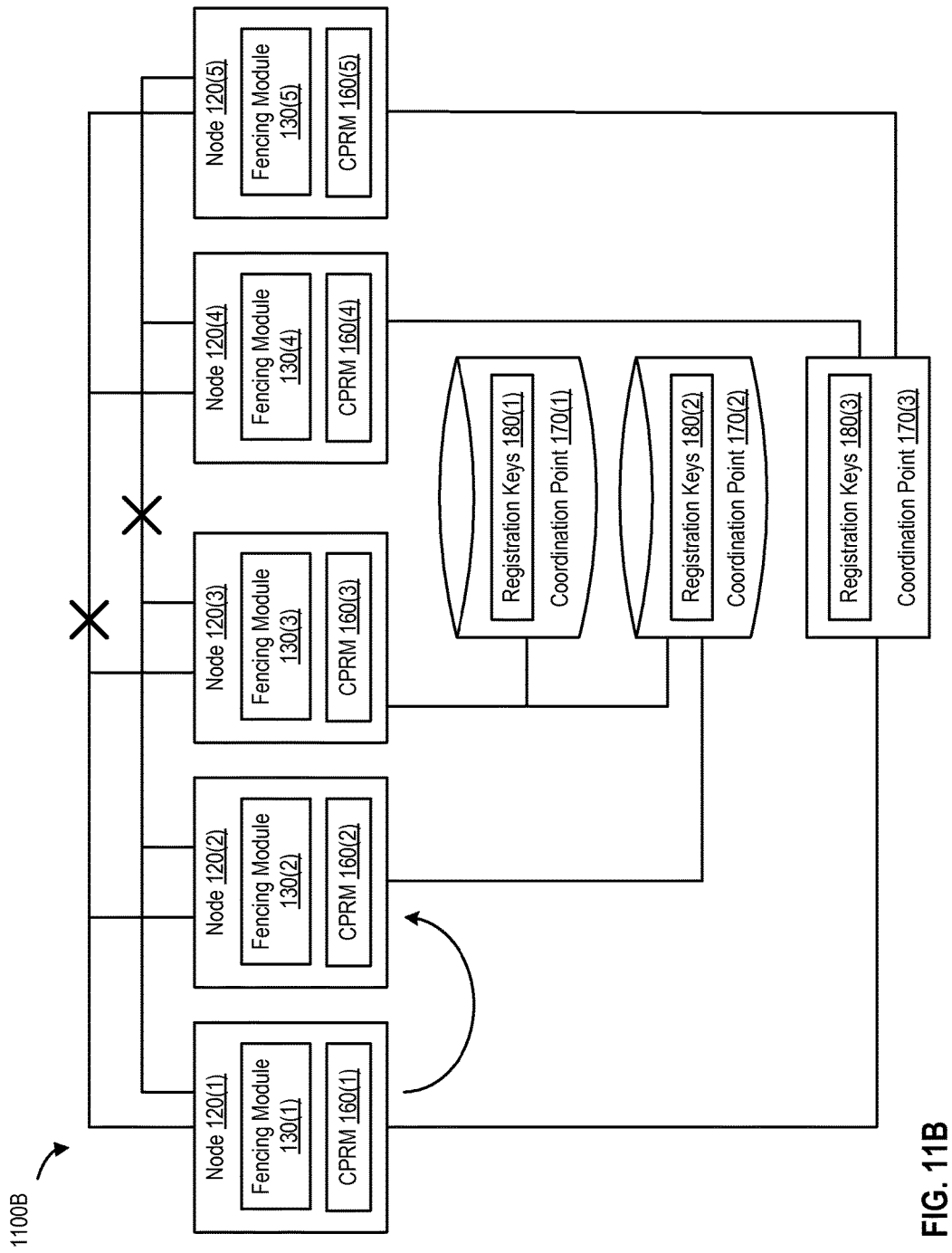
FIG. 11B is a block diagram of nodes in a partitioned cluster performing a fencing operation, according to one embodiment of the present disclosure.

FIG. 11B is a block diagram of nodes in a partitioned cluster performing a fencing operation, according to one embodiment. According to FIG. 11B, nodes 120(1), 120(2), and 120(3) are part of a first sub-cluster, and nodes 120(4) and 120(5) are part of a second sub-cluster. In some embodiments, nodes 120(4) and 120(4) access a CPRM (e.g., CPRM 160(4) and 160(5) respectively) and determine that nodes 120(4) and 120(5), either alone or in combination, cannot access a majority of coordination points. Upon this determination, both nodes 120(4) and 120(5) panic and leave the cluster (e.g., bail out). The nodes in first sub-cluster on the other hand can, together, reach a majority of the coordination points (e.g., as indicated by the CPRM). Therefore, the first sub-cluster elects node 120(1) as a racer node. Node 120(1) wins coordination point 170(3) and hands-off the racer node role to node 120(2) along with information that node 120(1) has won coordination point 170(3). At this point, node 120(2) resumes the fencing race and wins coordination points 170(1) and 170(2). Therefore, the first partition (or first sub-cluster) wins the fencing race in just one handoff, thus minimizing failover time for the cluster.

Figure 12A:
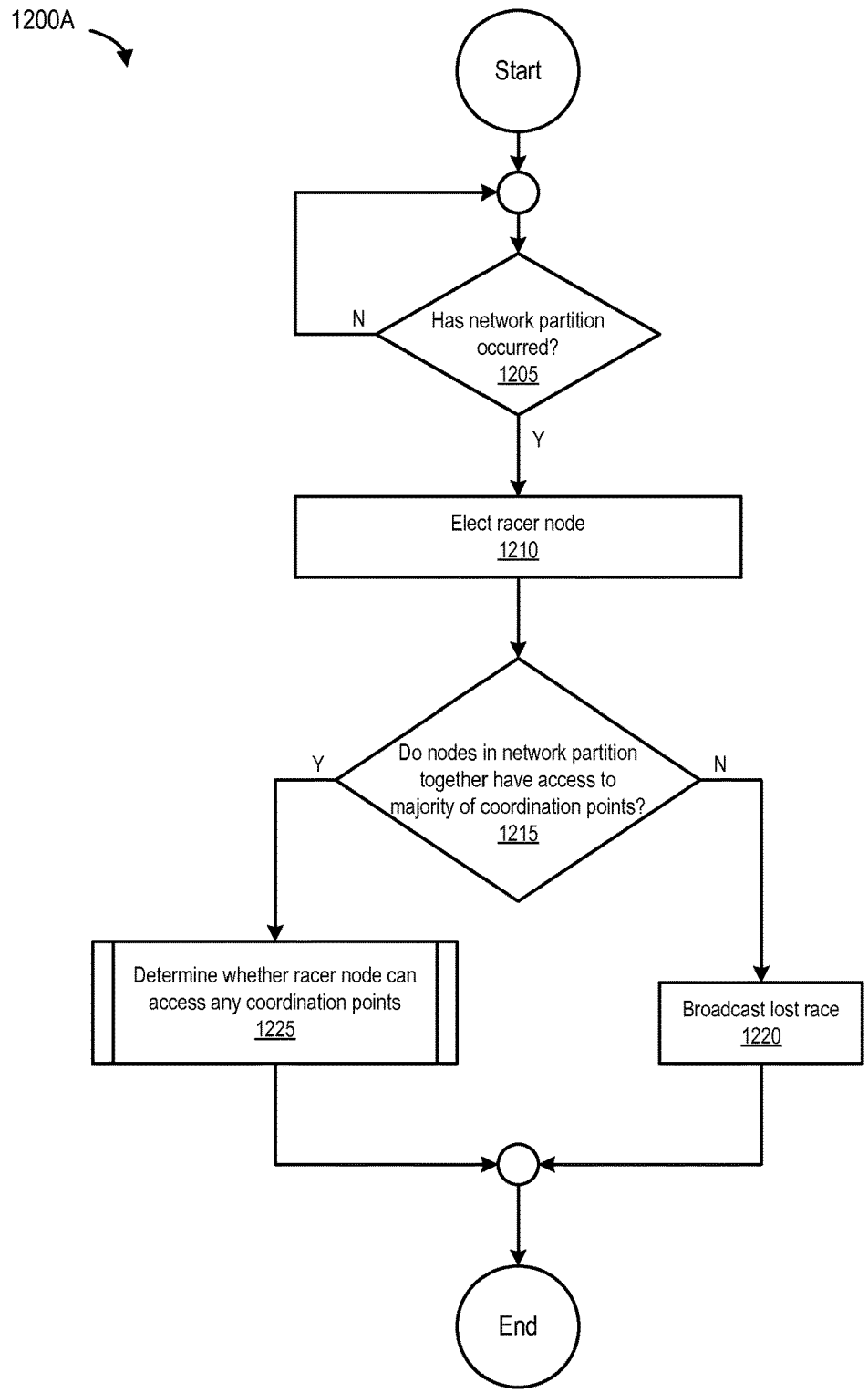
FIG. 12A is a flowchart of a process for electing a racer node after a network partition, according to one embodiment of the present disclosure.

FIG. 12A is a flowchart of a process for electing a racer node after a network partition, according to one embodiment. The process begins at 1205 by determining whether a network partition has occurred. If a cluster has been partitioned into two or more partitions (or sub-clusters), the process, at 1210, elects a racer node in a first sub-cluster (of the two or more sub-clusters). As previously noted, a node can be elected, selected, and/or designated as a racer node based on the node's node ID, or in some other manner.

At 1215, the process determines whether the nodes in the network partition (e.g., the first sub-cluster), together, have access to a majority of coordination points. As noted, this determination can be made by accessing a CPRM (e.g., CPRM 160 as shown in FIG. 10A). If nodes in the network partition (e.g., the first sub-cluster), together, do not have access to a majority of coordination points, the process, at 1220, broadcasts a lost (fencing) race to the whole cluster (e.g., to all the nodes in the cluster). However, if nodes in the network partition (e.g., the first sub-cluster), together, do have access to a majority of coordination points, the process ends at 1225 by determining whether the (elected) racer node can access any coordination points.

Figure 12B:
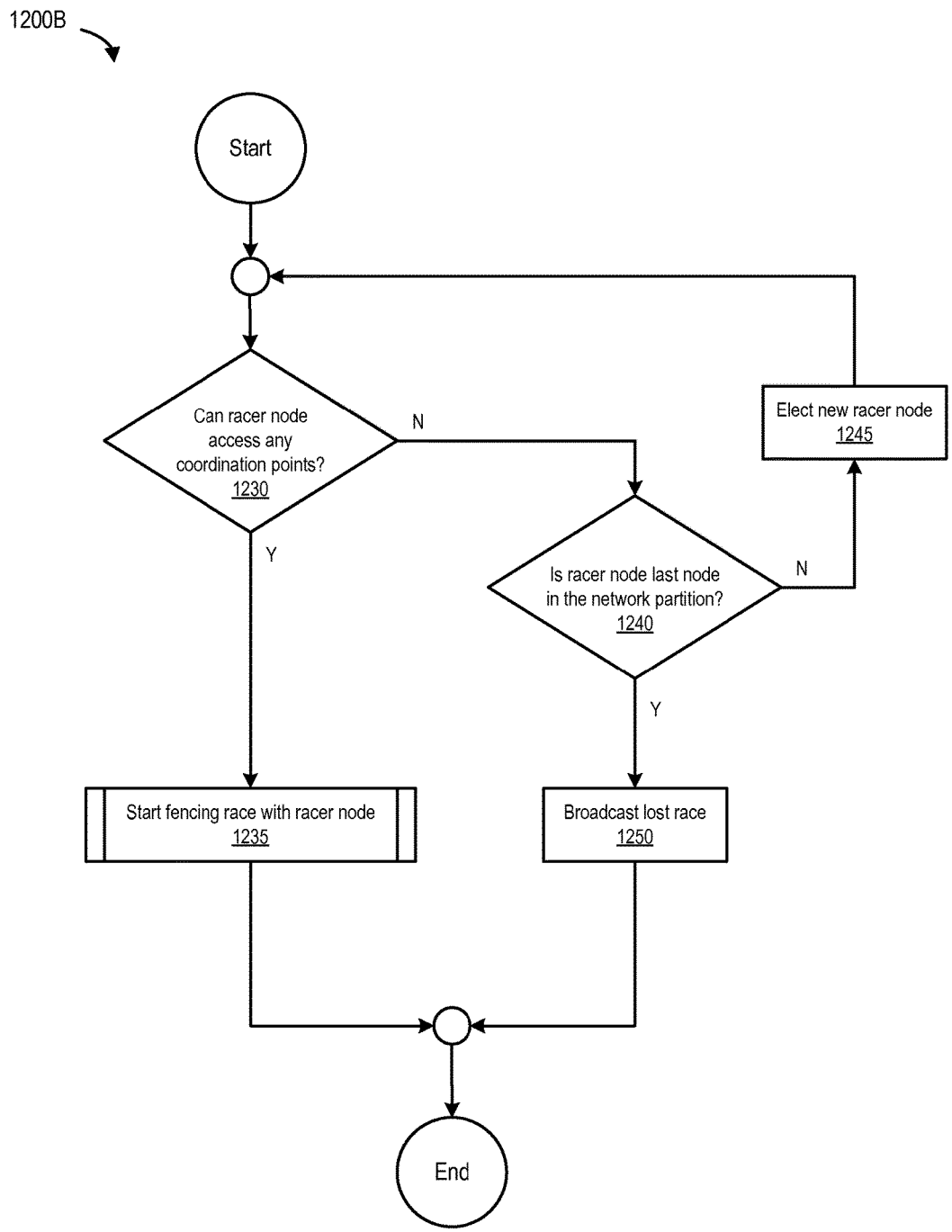
FIG. 12B is a flowchart of a process for determining whether a racer node can access coordination points in a cluster, according to one embodiment of the present disclosure.

FIG. 12B is a flowchart of a process for determining whether a racer node can access coordination points in a cluster, according to one embodiment of the present disclosure. The process begins at 1230 by determining whether a racer node can access any coordination points. If the racer node can access one or more coordination points, the process, at 1235, starts a fencing race with the racer node (e.g., a race to "win" (or claim) the coordination point by ejecting registration keys of other nodes that are on the coordination point, thus preempting those other nodes from winning that coordination point).

However, if the racer node cannot access one or more coordination points, the process, at 1240, determines whether the racer node is the last node in the network partition (e.g., whether there are any other nodes a given sub-cluster that the racer node belongs to). If the racer node is not the last node, at 1245, the process elects a new racer node (e.g., another node in the given sub-cluster). However, if the racer node is the last node (in the sub-cluster), the process ends at 1250 by broadcasting a lost race (e.g., to the other nodes in the cluster).

Figure 12C:
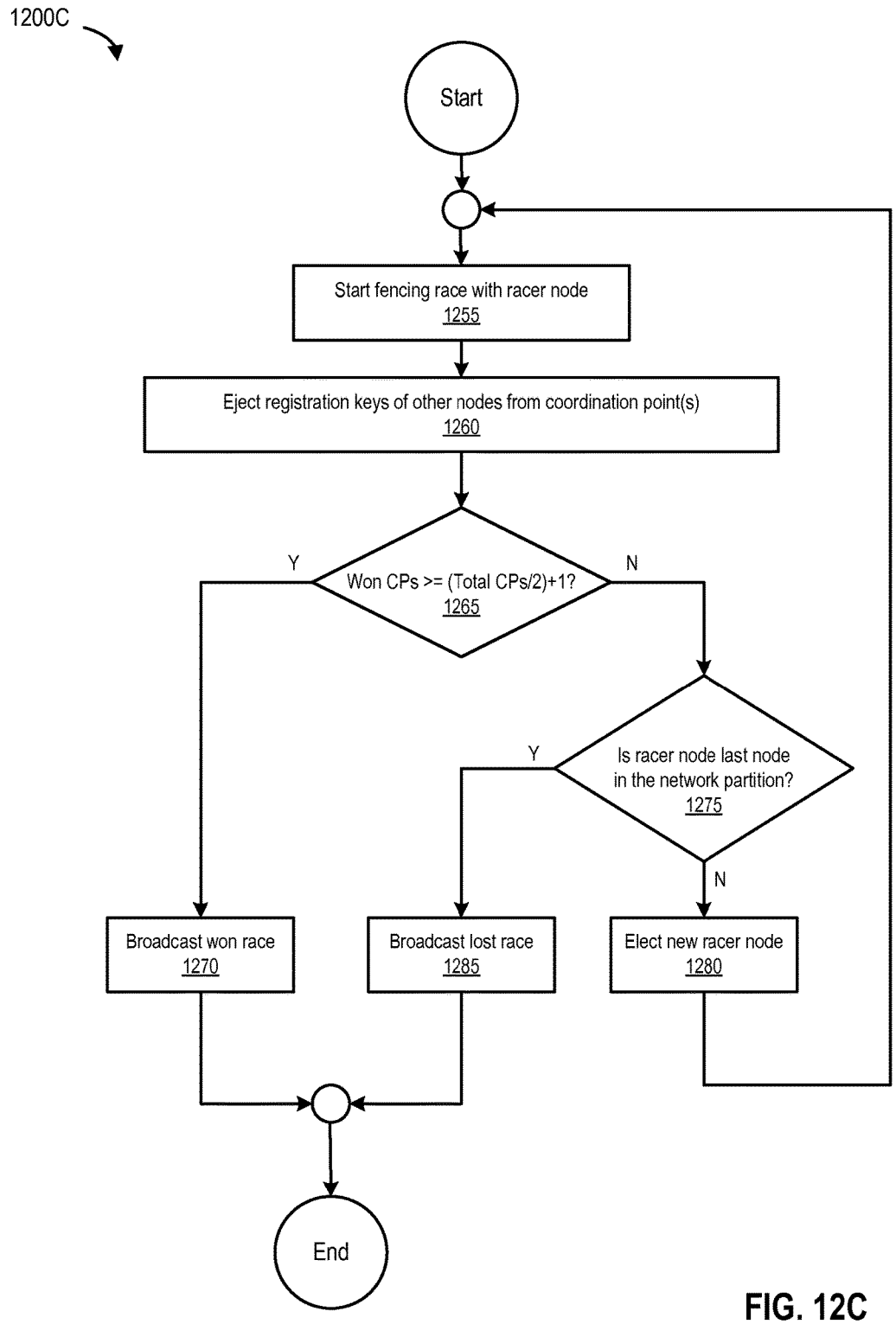
FIG. 12C is a flowchart of a process for performing a fencing operation with one or more racer nodes, according to one embodiment of the present disclosure.

FIG. 12C is a flowchart of a process for performing a fencing operation with one or more racer nodes, according to one embodiment. The process begins at 1255 by starting a fencing race with a racer node. At 1260, the process ejects the registration keys of other nodes from one or more coordination points (that the racer node can access or reach). In one embodiment, the racer node ejects only the registration keys of nodes not in the racer node's own partition (or sub-cluster) from the one or more coordination points. In another embodiment, the racer node ejects all registration keys of nodes other than the racer node's own registration key from the one or more coordination points.

At 1265, the process determines whether the coordination points won by the racer node are a majority of available coordination points. If the racer node has won the majority of coordination points, the process ends at 1270 by declaring a won (fencing) race. However, if the racer node has not won the majority of coordination points, the process, at 1275, determines whether the racer node is the last node in the network partition (e.g., e.g., whether there are any other nodes a given sub-cluster that the racer node belongs to). If the racer node is not the last node in the network partition, the process, at 1280, elects a new racer node and restarts the fencing race with the new racer node. However, if the racer node is the last node in the network partition, the process ends at 1285 by broadcasting a lost (fencing) race.

Processes to Optimize an I/O Fencing System that Uses Coordination Points

In one embodiment, upon node startup, fencing module 130 uses fencing driver 140 to configure I/O fencing operations for one or more node(s) in a cluster (e.g., cluster 110) using coordination point(s). In some embodiments, three (5) or five (5) coordination points (e.g., an odd number of coordination points) are provided for fencing operations (e.g., as indicated by configuration file 150). Also as previously noted, a coordination point can be a coordinator disk or a coordination point server, or any combination thereof.

In some embodiments, if a node shuts down (e.g., if a node exists and/or leaves the cluster for any reason), fencing module 130 uses CPRM 160 to determine whether a sub-cluster has access to a majority of coordination points (e.g., the remaining nodes in the partition). If CPRM 160 indicates that the sub-cluster does not have access to the majority of coordination points, fencing module 130 declares a lost fencing race and the partition panics (e.g., the remaining nodes also leave the cluster). However, if CPRM 160 indicates that the sub-cluster does have access to the majority of coordination points, fencing module 130 declares a won fencing race, and the partition survives (e.g., the remaining nodes continue operation).

In other embodiments, the fencing module of one node transmits the results of a race to win a coordination point to the fencing module of another node. For example, if node 120(1) is elected as a racer node and wins one (or more) coordination points, fencing module 160(1) transmits this information to fencing module 160(2) when node 120(2) is reelected as the racer node. In this manner, the race to win coordination points is performed incrementally from each node acting as a racer node.

Figure 13:
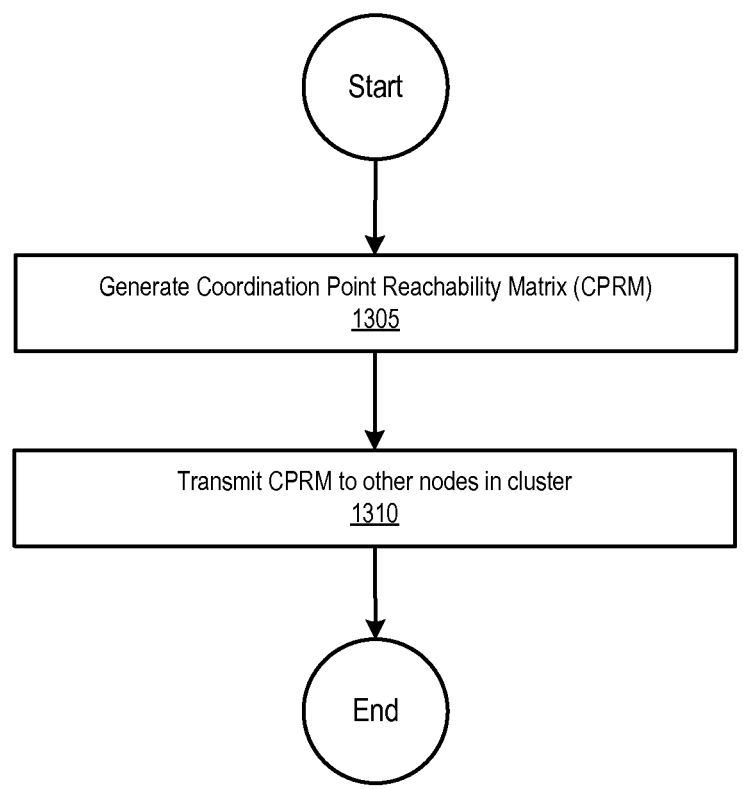
FIG. 13 is a flowchart of a process for generating and transmitting a CPRM, according to one embodiment of the present disclosure.

FIG. 13 is a flowchart of a process for generating and transmitting a (node's) CPRM, according to one embodiment. The process begins at 1305 by generating a coordination point reachability matrix (CPRM). Each node in a cluster can generate its own CPRM when it first joins the cluster (e.g., a node CPRM). In addition, once a node has successfully joined a cluster, a CPRM can be used to track the accessibility of all the nodes in the cluster to one or more coordination points available to the cluster (e.g., a cluster CPRM). As noted, the cluster's CPRM can be updated and replicated across one or more nodes in a cluster based on whether a new node joins the cluster and/or whether an existing node leaves the cluster. In addition, the winning of a coordination point by a node (e.g., a racer node) can also result in updates to the cluster's CPRM. The process ends at 1310 by transmitting the (node's) CPRM to other nodes in the cluster (e.g., to be merged, combined and/or updated with the cluster's CPRM).

Figure 14:
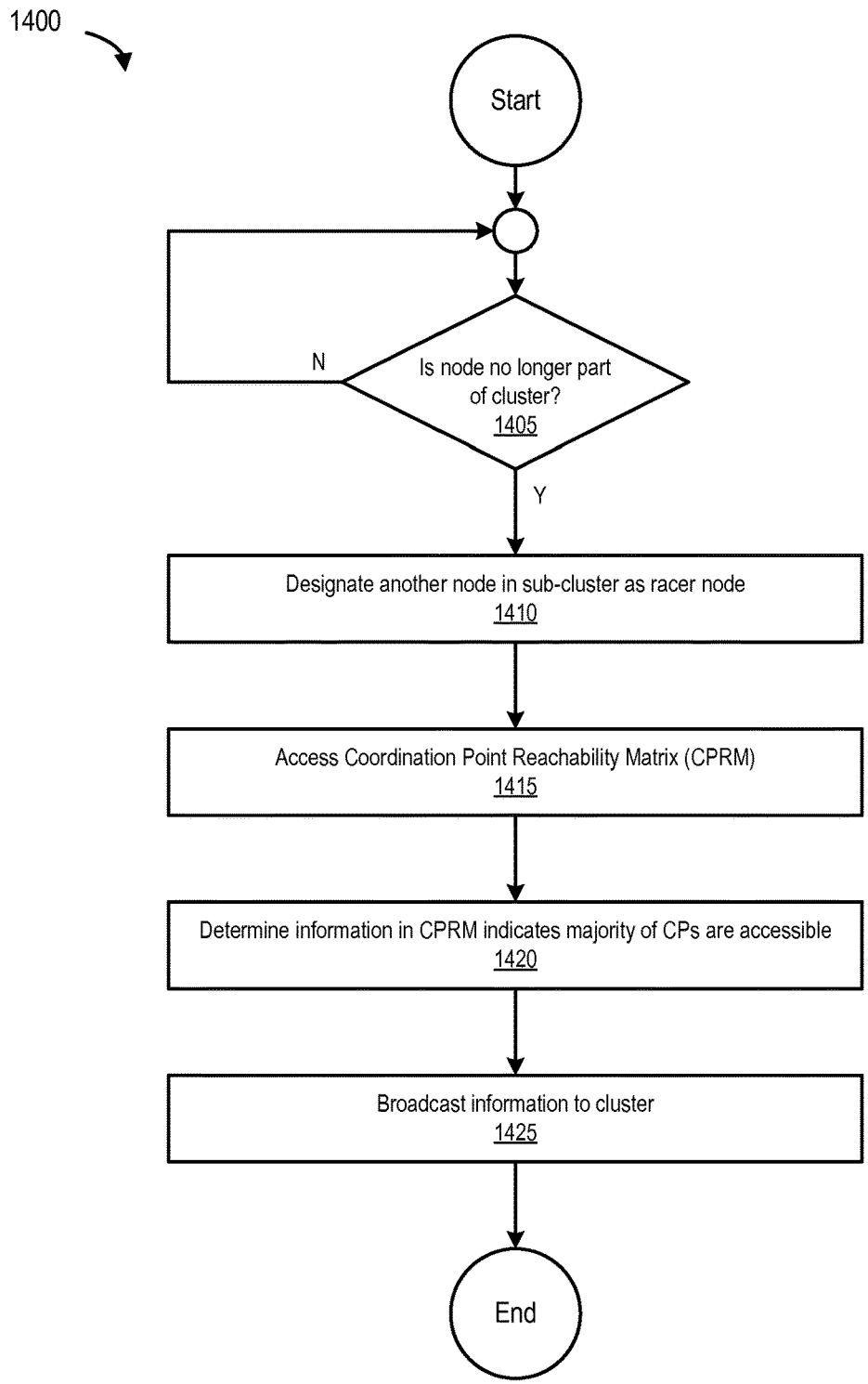
FIG. 14 is a flowchart of a process for broadcasting information to a cluster, according to one embodiment of the present disclosure.

FIG. 14 is a flowchart of a process for broadcasting information to a cluster, according to one embodiment of the present disclosure. The process begins at 1405 by determining whether a node is still part of a cluster. If the node is no longer part of the cluster, the process, at 1410, designates another node in the node's sub-cluster as a racer node. At 1415, the process accesses a CPRM. At 1420, the process determines that information in the CPRM indicates that a majority of coordination points are accessible (by remaining nodes in the sub-cluster, either alone or in combination). At 1425, the process ends by broadcasting this information to the cluster.

Figure 15:
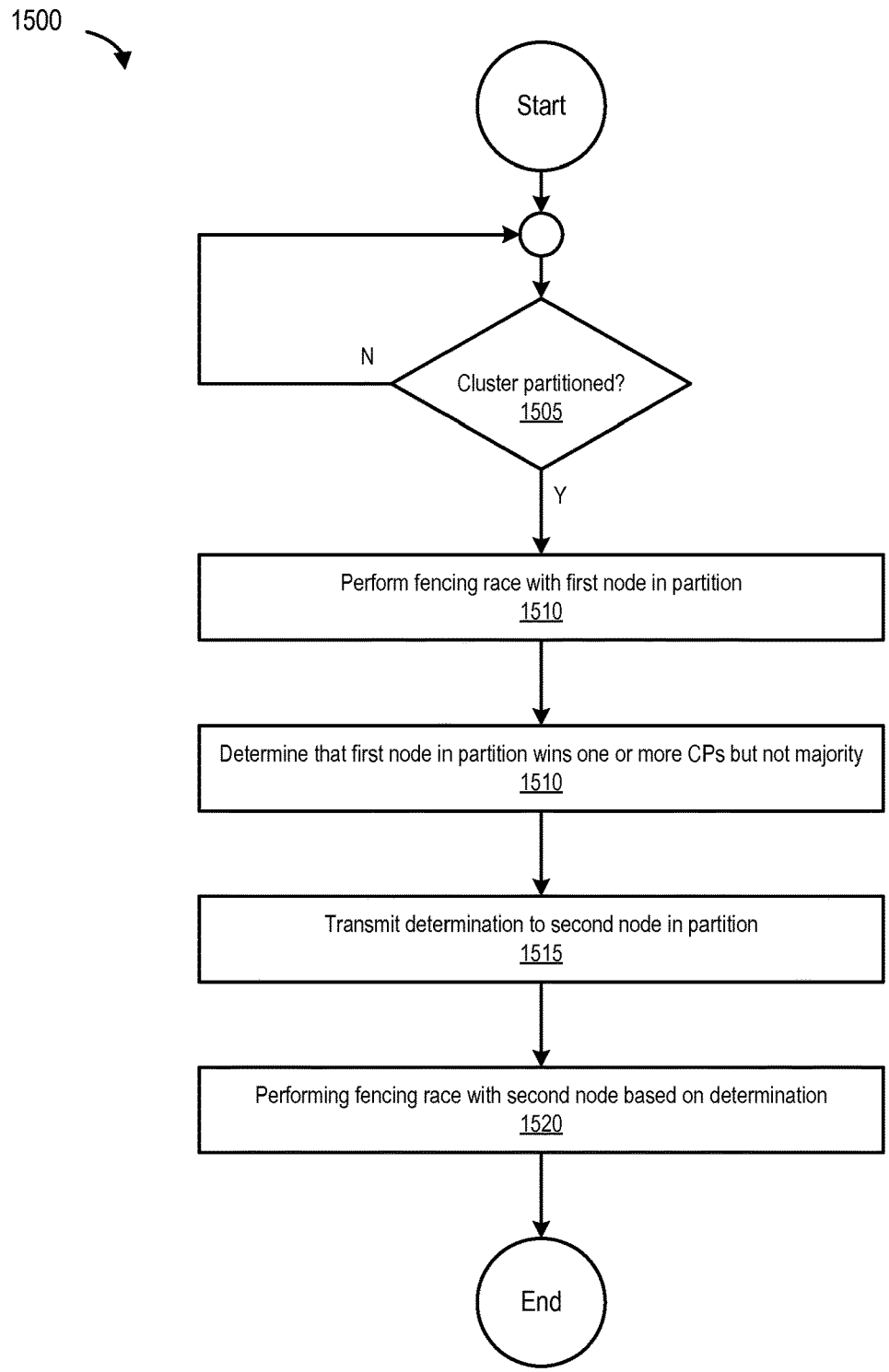
FIG. 15 is a flowchart of a process for transmitting results of a fencing race from one node to another node, according to one embodiment of the present disclosure.

FIG. 15 is a flowchart of a process for transmitting results of a fencing race from one node to another node, according to one embodiment. The process begins at 1505 by determining whether a cluster is partitioned. If the cluster is partitioned, the process, at 1510, performs (or begins) a fencing race (to win coordination points) using a first node in the partition (e.g., a (first) racer node a first sub-cluster). At 1515, the process determines that the first node in the partition wins one or more coordination points, but not the majority of the coordination points. At 1520, the process transmits this determination to a second node in the partition (e.g., a (second) racer node in the first sub-cluster). The process ends at 1520 by performing (or continuing) the fencing race with the second node (based on the transmitted (and received) determination from the first node).

It will be appreciated that the systems, methods, and processes described herein prevent data corruption due to a pre-existing split brain condition in a cluster.

An Example Computing Environment

Figure 16:
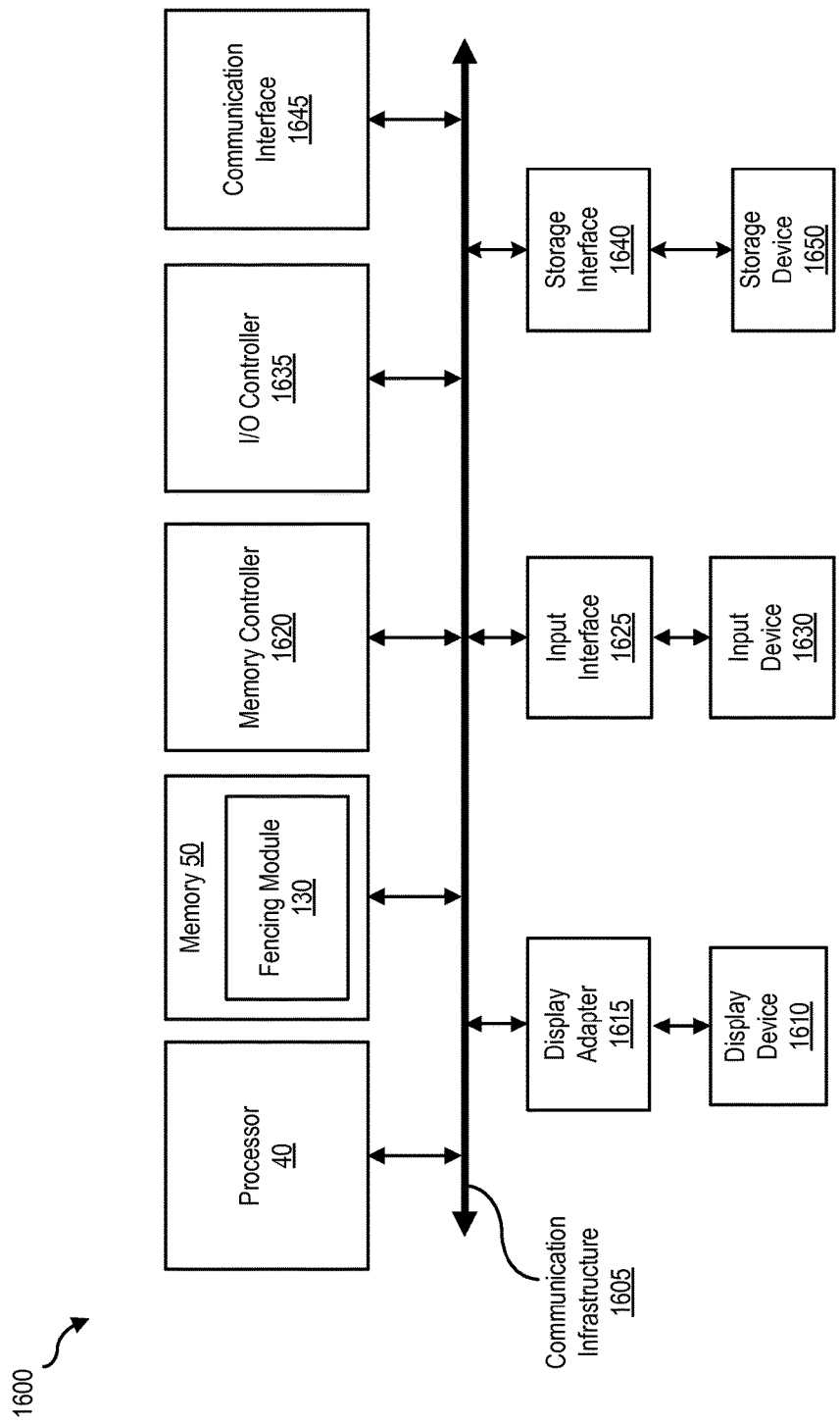
FIG. 16 is a block diagram of a computing system, illustrating how a fencing module can be implemented in software, according to one embodiment of the present disclosure.

FIG. 16 is a block diagram of a computing system, illustrating how a fencing module can be implemented in software, according to one embodiment of the present disclosure. Computing system 1600 broadly represents any single or multi-processor computing device or system capable of executing computer-readable instructions. Examples of computing system 1600 include, without limitation, any one or more of a variety of devices including workstations, personal computers, laptops, client-side terminals, servers, distributed computing systems, handheld devices, network appliances, storage controllers, and the like. Computing system 1600 may include at least one processor 40 and a memory 50. By executing the software that implements server 30, computing system 1600 becomes a special purpose computing device that is configured to prevent data corruption caused by a pre-existing split brain condition in a cluster.

Processor 40 generally represents any type or form of processing unit capable of processing data or interpreting and executing instructions. In certain embodiments, processor 40 may receive instructions from a software application or module. These instructions may cause processor 40 to perform the functions of one or more of the embodiments described and/or illustrated herein. For example, processor 40 may perform and/or be a means for performing all or some of the operations described herein. Processor 40 may also perform and/or be a means for performing any other operations, methods, or processes described and/or illustrated herein.

Memory 50 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 1600 may include both a volatile memory unit and a non-volatile storage device. In one example, program instructions implementing a fencing module 130 may be loaded into memory 50.

In certain embodiments, computing system 1600 may also include one or more components or elements in addition to processor 40 and memory 50. For example, as illustrated in FIG. 16, computing system 1600 may include a memory controller 1620, an Input/Output (I/O) controller 1635, and a communication interface 1645, each of which may be interconnected via a communication infrastructure 1605. Communication infrastructure 1605 generally represents any type or form of infrastructure capable of facilitating communication between one or more components of a computing device. Examples of communication infrastructure 1605 include, without limitation, a communication bus (e.g., Industry Standard Architecture (ISA), Peripheral Component Interconnect (PCI), PCI express (PCIe), or similar bus) and a network.

Memory controller 1620 generally represents any type or form of device capable of handling memory or data or controlling communication between one or more components of computing system 1600. For example, in certain embodiments memory controller 1620 may control communication between processor 40, memory 50, and I/O controller 1635 via communication infrastructure 1605. In certain embodiments, memory controller 1620 may perform and/or be a means for performing, either alone or in combination with other elements, one or more of the operations or features described and/or illustrated herein.

I/O controller 1635 generally represents any type or form of module capable of coordinating and/or controlling the input and output functions of a computing device. For example, I/O controller 1635 may control or facilitate transfer of data between one or more elements of computing system 1600, such as processor 40, memory 50, communication interface 1645, display adapter 1615, input interface 1625, and storage interface 1640.

Communication interface 1645 broadly represents any type or form of communication device or adapter capable of facilitating communication between computing system 1600 and one or more additional devices. For example, in certain embodiments communication interface 1645 may facilitate communication between computing system 1600 and a private or public network including additional computing systems. Examples of communication interface 1645 include, without limitation, a wired network interface (such as a network interface card), a wireless network interface (such as a wireless network interface card), a modem, and any other suitable interface. In at least one embodiment, communication interface 1645 may provide a direct connection to a remote server via a direct link to a network, such as the Internet. Communication interface 1645 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1645 may also represent a host adapter configured to facilitate communication between computing system 1600 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 1645 may also allow computing system 1600 to engage in distributed or remote computing. For example, communication interface 1645 may receive instructions from a remote device or send instructions to a remote device for execution.

As illustrated in FIG. 16, computing system 1600 may also include at least one display device 1610 coupled to communication infrastructure 1605 via a display adapter 1615. Display device 1610 generally represents any type or form of device capable of visually displaying information forwarded by display adapter 1615. Similarly, display adapter 1615 generally represents any type or form of device configured to forward graphics, text, and other data from communication infrastructure 1605 (or from a frame buffer, as known in the art) for display on display device 1610.

As illustrated in FIG. 16, computing system 1600 may also include at least one input device 1630 coupled to communication infrastructure 1605 via an input interface 1625. Input device 1630 generally represents any type or form of input device capable of providing input, either computer or human generated, to computing system 1600. Examples of input device 1630 include, without limitation, a keyboard, a pointing device, a speech recognition device, or any other input device.

As illustrated in FIG. 16, computing system 1600 may also include storage device 1650 to communication infrastructure 1605 via a storage interface 1640. Storage device 1650 generally represents any type or form of storage devices or mediums capable of storing data and/or other computer-readable instructions. For example, storage device 1650 may include a magnetic disk drive (e.g., a so-called hard drive), a floppy disk drive, a magnetic tape drive, an optical disk drive, a flash drive, or the like. Storage interface 1640 generally represents any type or form of interface or device for transferring and/or transmitting data between storage device 1650, and other components of computing system 1600.

In certain embodiments, storage device 1650 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 1650 may also include other similar structures or devices for allowing computer software, data, or other computer-readable instructions to be loaded into computing system 1600. For example, storage device 1650 may be configured to read and write software, data, or other computer-readable information. Storage device 1650 may also be a part of computing system 1600 or may be separate devices accessed through other interface systems.

Many other devices or subsystems may be connected to computing system 1600. Conversely, all of the components and devices illustrated in FIG. 16 need not be present to practice the embodiments described and/or illustrated herein. The devices and subsystems referenced above may also be interconnected in different ways from that shown in FIG. 16.

Computing system 1600 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1600 for storage in memory via a network such as the Internet or upon a carrier medium.

The computer-readable medium containing the computer program may be loaded into computing system 1600. All or a portion of the computer program stored on the computer-readable medium may then be stored in memory 50 and/or various portions of storage device 1650. When executed by processor 40, a computer program loaded into computing system 1600 may cause processor 40 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1600 may be configured as an application specific integrated circuit (ASIC) adapted to implement one or more of the embodiments disclosed herein.

An Example Networking Environment

Figure 17:
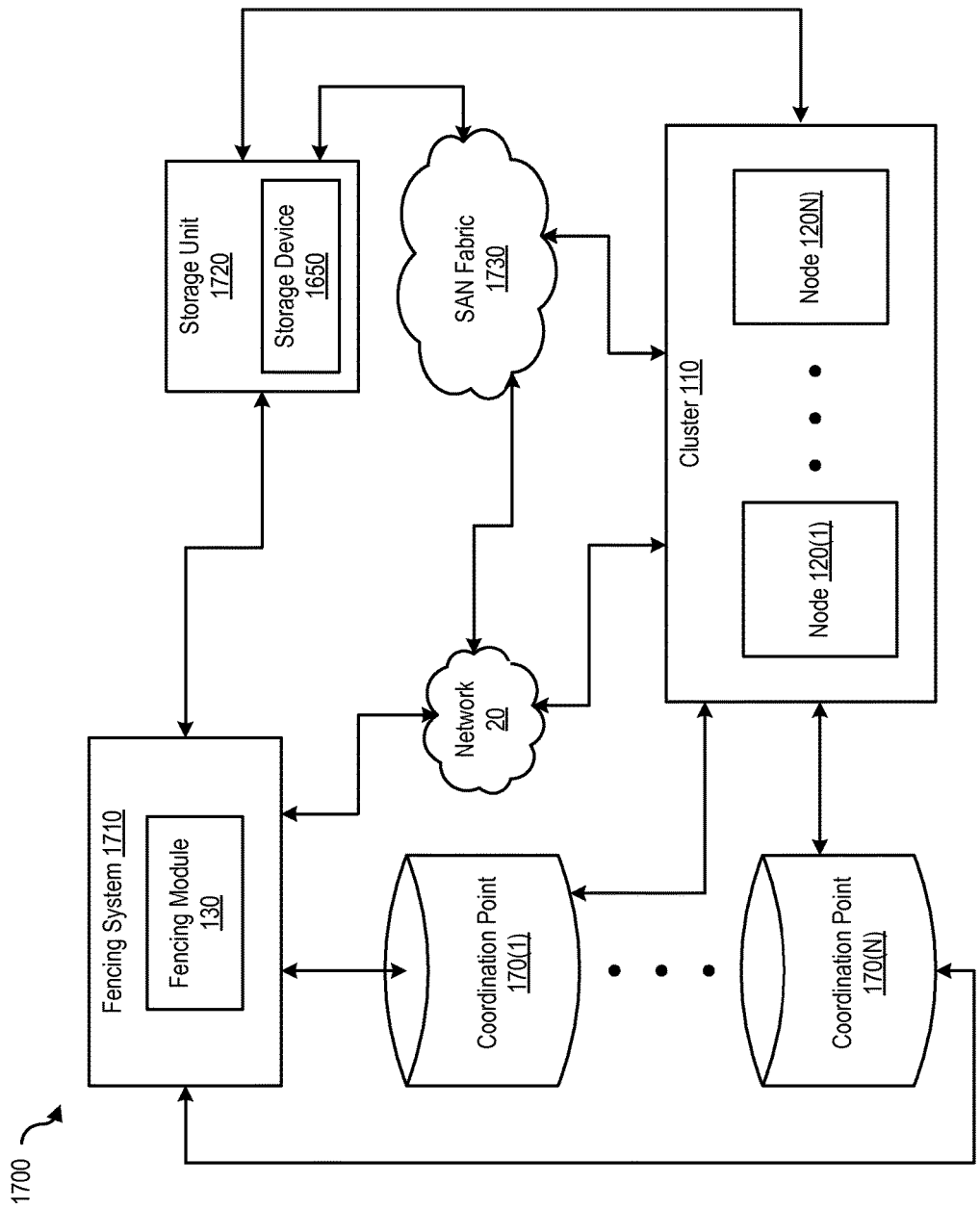
FIG. 17 is a block diagram of a networked system, illustrating how various computing devices can communicate via a network, according to one embodiment of the present disclosure.

FIG. 17 is a block diagram of a networked system, illustrating how various computing devices can communicate via a network, according to one embodiment of the present disclosure. In certain embodiments, network-attached storage (NAS) devices may be configured to communicate with cluster 110 using various protocols, such as Network File System (NFS), Server Message Block (SMB), or Common Internet File System (CIFS).

Network 20 generally represents any type or form of computer network or architecture capable of facilitating communication between multiple computing devices. Network 20 may facilitate communication between cluster 110 and storage unit 1720. In certain embodiments, and with reference to computing system 1600 of FIG. 16, a communication interface, such as communication interface 1645 in FIG. 16, may be used to provide connectivity between cluster 110 and network 20. It should be noted that the embodiments described and/or illustrated herein are not limited to the Internet or any particular network-based environment. For example, network 20 can be a Storage Area Network (SAN).

In at least one embodiment, all or a portion of one or more of the embodiments disclosed herein may be encoded as a computer program and loaded onto and executed by cluster 110, server 30, client 10, and nodes 120(1)-(N), or any combination thereof. In addition, all or a portion of one or more of the embodiments disclosed herein may also be encoded as a computer program, stored on client 10, server 30, cluster 110, and/or nodes 120(1)-(N), and distributed over network 20.

In some examples, all or a portion of the computing device in FIGS. 1A, 1B, and 2 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, client 10, server 30, and/or nodes 120(1)-(N) may transform behavior of a computing device, cluster, and/or server in order to cause the computing device, cluster, and/or server to prevent data corruption due to a pre-existing split brain condition in a cluster.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
    in response to determining that a node is no longer part of a sub-cluster of a cluster, designating another node in the sub-cluster as a racer node;
    the racer node accessing a matrix, wherein
        the matrix comprises information to determine whether a majority of a plurality of coordination points in the cluster are accessible during a fence race by a plurality of nodes in the sub-cluster, wherein each of the coordination points can fence off one or more nodes in the cluster from accessing one or more storage devices, and
        the plurality of coordination points comprise an odd number of coordination points;
    based on the accessing, determining that the information indicates that the majority of the plurality of coordination points are accessible by the plurality of nodes; and
    broadcasting the information.

2. The computer-implemented method of claim 1, wherein
    the node that is no longer part of the sub-cluster, previously had access to the majority of the plurality of coordination points.

3. The computer-implemented method of claim 1, further comprising:
    after determining that the node is no longer part of the sub-cluster, and prior to designating the another node as the racer node, determining that no node in the sub-cluster had access to the majority of the plurality of coordination points.

4. The computer-implemented method of claim 1, wherein
    broadcasting the information comprises updating the matrix with the information indicating that the majority of the plurality of coordination points are accessible by the plurality of nodes in the sub-cluster, wherein
        the information is broadcasted to the cluster, and
        the information also indicates that a fencing race performed by the racer node is successful.

5. The computer-implemented method of claim 4, further comprising:
    based on the information, inhibiting a partitioned node from accessing one or more coordination points of the majority of the plurality of coordination points accessible by the plurality of nodes in the sub-cluster, wherein
        the inhibiting prevents a pre-existing split brain condition from occurring in the cluster.

6. The computer-implemented method of claim 1, wherein
    the matrix is a coordination point reachability matrix (CPRM), and
    the CPRM is replicated across all nodes of the plurality of nodes in the cluster.

7. The computer-implemented method of claim 1, wherein
    the plurality of coordination points comprise
        one or more coordinator disks, or
        one or more coordination point servers.

8. A non-transitory computer readable storage medium storing program instructions executable for:
    in response to determining that a node is no longer part of a sub-cluster of a cluster,
        designating another node in the sub-cluster as a racer node;
        accessing a matrix, wherein
            the matrix comprises information to determine whether a majority of a plurality of coordination points in the cluster are accessible during a fence race by a plurality of nodes in the sub-cluster, wherein each of the coordination points can fence off one or more nodes in the cluster from accessing one or more storage devices, and
            the plurality of coordination points comprise an odd number of coordination points;
        based on the accessing, determining that the information indicates that the majority of the plurality of coordination points are accessible by the plurality of nodes; and
        broadcasting the information.

9. The non-transitory computer readable storage medium of claim 8, wherein the node that is no longer part of the sub-cluster, previously had access to the majority of the plurality of coordination points.

10. The non-transitory computer readable storage medium of claim 8, wherein the program instructions are further executable for:
    after determining that the node is no longer part of the sub-cluster, and prior to designating the another node as the racer node, determining that no node in the sub-cluster had access to the majority of the plurality of coordination points.

11. The non-transitory computer readable storage medium of claim 8, wherein
    broadcasting the information comprises updating the matrix with the information indicating that the majority of the plurality of coordination points are accessible by the plurality of nodes in the sub-cluster, wherein the information is broadcasted to the cluster, and
the information also indicates that a fencing race performed by the racer node is successful.

12. The non-transitory computer readable storage medium of claim 11, wherein the program instructions are further executable for:
based on the information, inhibiting a partitioned node from accessing one or more coordination points of the majority of the plurality of coordination points accessible by the plurality of nodes in the sub-cluster, wherein
the inhibiting prevents a pre-existing split brain condition from occurring in the cluster.

13. The non-transitory computer readable storage medium of claim 8, wherein
the matrix is a coordination point reachability matrix (CPRM), and
the CPRM is replicated across all nodes of the plurality of nodes in the cluster.

14. A system comprising:
one or more processors; and
a memory coupled to the one or more processors, wherein the memory stores program instructions executable by the one or more processors for:
in response to determining that a node is no longer part of a sub-cluster of a cluster,
designating another node in the sub-cluster as a racer node;
the racer node accessing a matrix, wherein
the matrix comprises information to determine whether a majority of a plurality of coordination points in the cluster are accessible during a fence race by a plurality of nodes in the sub-cluster, wherein each of the coordination points can fence off one or more nodes in the cluster from accessing one or more storage devices, and
the plurality of coordination points comprise an odd number of coordination points;
based on the accessing, determining that the information indicates that the majority of the plurality of coordination points are accessible by the plurality of nodes; and
broadcasting the information.

15. The system of claim 14, wherein
the node that is no longer part of the sub-cluster previously, had access to the majority of the plurality of coordination points.

16. The system of claim 14 wherein the program instructions are further executable for:
after determining that the node is no longer part of the sub-cluster, and prior to designating the another node as the racer node, determining that no node in the sub-cluster had access to the majority of the plurality of coordination points.

17. The system of claim 14, wherein
broadcasting the information comprises updating the matrix with the information indicating that the majority of the plurality of coordination points are accessible by the plurality of nodes in the sub-cluster, wherein
the information is broadcasted to the cluster, and
the information also indicates that a fencing race performed by the racer node is successful.

18. The system of claim 17 wherein the program instructions are further executable for:
based on the information, inhibiting a partitioned node from accessing one or more coordination points of the majority of the plurality of coordination points accessible by the plurality of nodes in the sub-cluster, wherein
the inhibiting prevents a pre-existing split brain condition from occurring in the cluster.

19. The system of claim 14, wherein
the matrix is a coordination point reachability matrix (CPRM), and
the CPRM is replicated across all nodes of the plurality of nodes in the cluster.

20. The system of claim 14, wherein
the plurality of coordination points comprise
one or more coordinator disks, or
one or more coordination point servers.

* * * * *